US012711091B2

(12) United States Patent
Kim

(10) Patent No.: US 12,711,091 B2
(45) Date of Patent: Aug. 18, 2026

(54) SYSTEM ON CHIP

(71) Applicant: SAMSUNG ELECTRONICS CO., LTD., Suwon-si (KR)

(72) Inventor: Minha Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 18/640,848

(22) Filed: Apr. 19, 2024

(65) Prior Publication Data

US 2025/0068579 A1 Feb. 27, 2025

(30) Foreign Application Priority Data

Aug. 25, 2023 (KR) ........................ 10-2023-0112251

(51) Int. Cl.
*G06F 13/42* (2006.01)

(52) U.S. Cl.
CPC .................................... *G06F 13/42* (2013.01)

(58) Field of Classification Search
CPC ....................................................... G06F 13/42
USPC .......................................................... 710/105
See application file for complete search history.

(56) References Cited

U.S. PATENT DOCUMENTS 7,516,382 B2 4/2009 Lee et al.
7,852,685 B2 12/2010 Iwasa et al.
8,405,529 B2 3/2013 Chang
8,589,706 B2 11/2013 Zhang et al.
10,445,288 B2 * 10/2019 Chu .................... G06F 13/4282
10,545,888 B2 * 1/2020 Hong .................... G11C 7/1087
10,747,695 B2 * 8/2020 Ho ........................ G11C 7/1006
2009/0182918 A1 7/2009 Hollis
2010/0138577 A1 * 6/2010 Hong .................. G06F 13/4018 710/110
2012/0246368 A1 * 9/2012 Kwon ................. G06F 13/4022 710/110
2013/0031284 A1 * 1/2013 Yun ....................... G06F 13/364 710/105
2015/0363260 A1 12/2015 Hollis
2020/0251159 A1 * 8/2020 Lanka .................... G11C 7/106
2021/0182223 A1 * 6/2021 Choi .................... G11C 7/1051
2023/0073629 A1 * 3/2023 Han ..................... H04L 25/4917
2024/0193114 A1 * 6/2024 Fang ................... G06F 13/4273

FOREIGN PATENT DOCUMENTS

JP 2008-152870 7/2008
KR 10-2018-0057028 5/2018

OTHER PUBLICATIONS

Extended European Search Report in European Appln. No. 24178586.4, mailed on Oct. 21, 2024, 8 pages.

* cited by examiner

*Primary Examiner* — Christopher B Shin
(74) *Attorney, Agent, or Firm* — Fish & Richardson P.C.

(57) ABSTRACT

A system on chip is provided. The system on chip includes a bus including a data channel through which data is transmitted in at least one direction and a master interface configured to receive first data from the data channel, perform a bit operation on the first data and on second data input before input of the first data, determine an encoding operation for the first data based on a result of the bit operation, perform the encoding operation on the first data, to obtain encoded data, and provide the encoded data and a transformation signal indicating the encoding operation to the data channel.

13 Claims, 15 Drawing Sheets

FIG. 2

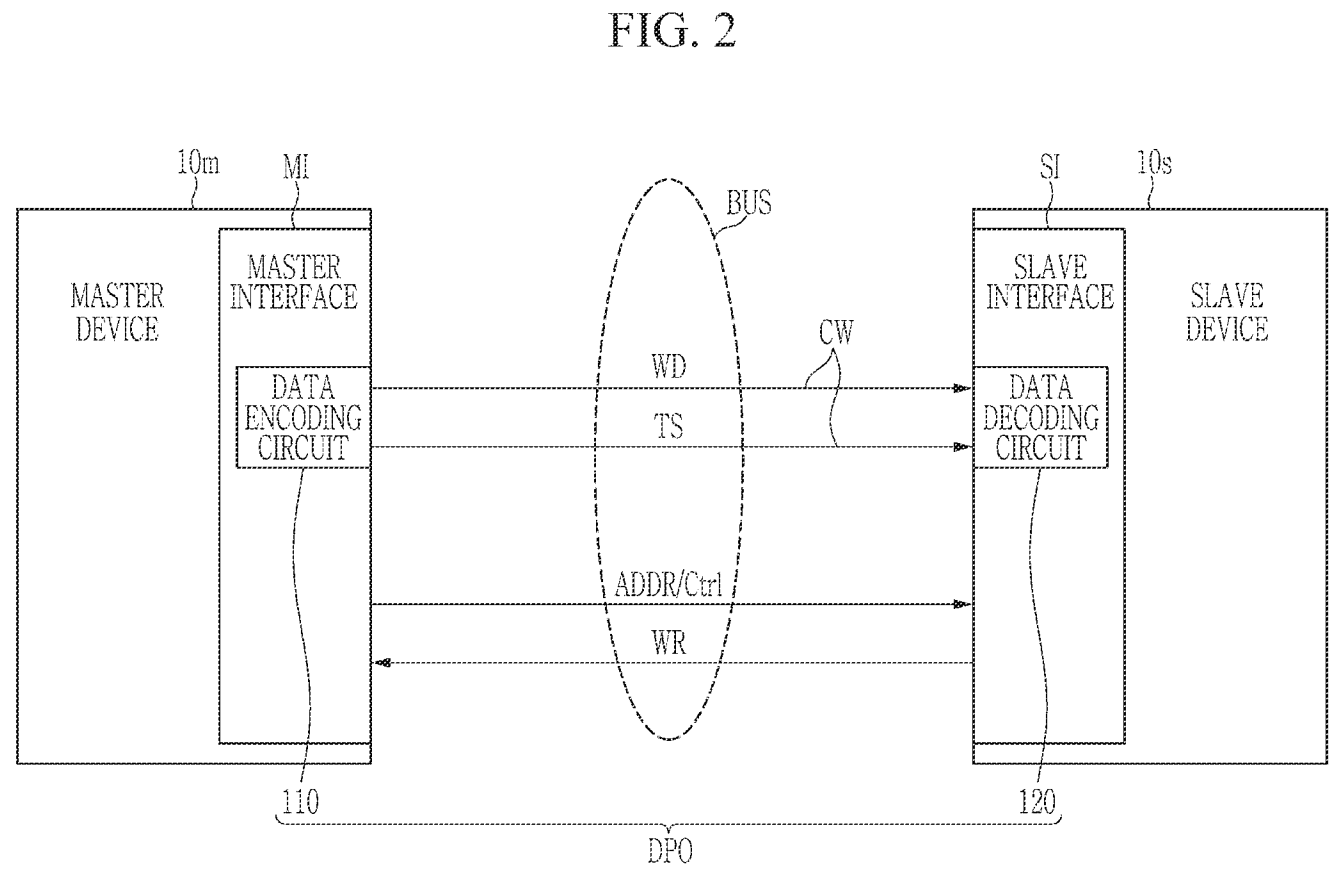

SLAVE DEVICE
10s
SI
SLAVE INTERFACE
DATA DECODING CIRCUIT
120
CW
BUS
WD
TS
ADDR/Ctrl
WR
DPO
MI
MASTER INTERFACE
DATA ENCODING CIRCUIT
110
10m
MASTER DEVICE 120
122
CGs
FFs
121
DDo-1[0:m]
DDo[0:m]
120DT
DATA TRANSFORMATION LOGIC
SSo
SIo
129
CONTROL UNIT
129PS
PATTERN SELECTOR
Do[0:m]
Tso

FIG. 8

DPn+1[0:7]: 11101010(2)/(clockcycle3), 00001110(2)/(clockcycle2), 11101011(2)/(clockcycle1)

| # | Dn[#] | Dpn+1[#] | XORout[#] | XNORout[#] | SIn+1 | SSn+1 | Tsn+1 | Dn+1[#] |
|---|---|---|---|---|---|---|---|---|
| 0 | - | 1 | - | - | - | - | 0 | 1 |
| 1 | - | 1 | - | - | | | | 1 |
| 2 | - | 0 | - | - | | | | 0 |
| 3 | - | 1 | - | - | | | | 1 |
| 4 | - | 0 | - | - | | | | 0 |
| 5 | - | 1 | - | - | | | | 1 |
| 6 | - | 1 | - | - | | | | 1 |
| 7 | - | 1 | - | - | | | | 1 |

clockcycle1, A : -, B : -

KEEP

| # | Dn[#] | Dpn+1[#] | XORout[#] | XNORout[#] | SIn+1 | SSn+1 | Tsn+1 | Dn+1[#] |
|---|---|---|---|---|---|---|---|---|
| 0 | 1 | 0 | 1 | 1 | 1 | 0 | 1 | 1 |
| 1 | 1 | 1 | 0 | 1 | | | | 0 |
| 2 | 0 | 1 | 1 | 0 | | | | 0 |
| 3 | 1 | 1 | 0 | 0 | | | | 0 |
| 4 | 0 | 0 | 0 | 1 | | | | 1 |
| 5 | 1 | 0 | 1 | 0 | | | | 1 |
| 6 | 1 | 0 | 1 | 0 | | | | 1 |
| 7 | 1 | 0 | 1 | 0 | | | | 1 |

clockcycle2, A : 5, B : 3

INVERT

| # | Dn[#] | Dpn+1[#] | XORout[#] | XNORout[#] | SIn+1 | SSn+1 | Tsn+1 | Dn+1[#] |
|---|---|---|---|---|---|---|---|---|
| 0 | 1 | 0 | 1 | 1 | 0 | 1 | 1 | 1 |
| 1 | 0 | 1 | 1 | 1 | | | | 0 |
| 2 | 0 | 0 | 0 | 0 | | | | 1 |
| 3 | 0 | 1 | 1 | 1 | | | | 0 |
| 4 | 1 | 0 | 1 | 1 | | | | 1 |
| 5 | 1 | 1 | 0 | 1 | | | | 1 |
| 6 | 1 | 1 | 0 | 1 | | | | 1 |
| 7 | 1 | 1 | 0 | 0 | | | | 0 |

clockcycle3, A : 4, B : 6

CIRCULAR SHIFT

FIG. 9

DPn+1[0:7]: 10100001(2)/(clockcycle4), 11101111(2)/(clockcycle3), 10100010(2)/(clockcycle2), 01000001(2)/(clockcycle1)

| # | Dn[#] | Dpn+1[#] | XORout[#] | XNORout[#] | Sln+1 | IEn | SSn+1 | SEn | Tsn+1 | Dn+1[#] | Clock Gated |
|---|---|---|---|---|---|---|---|---|---|---|---|
| 0 | - | 1 | - | - | - | - | - | - | 0 | 1 | - |
| 1 | - | 0 | - | - | | | | | | 0 | - |
| 2 | - | 0 | - | - | | | | | | 0 | - |
| 3 | - | 0 | - | - | | | | | | 0 | - |
| 4 | - | 0 | - | - | | | | | | 0 | - |
| 5 | - | 0 | - | - | | | | | | 0 | - |
| 6 | - | 1 | - | - | | | | | | 1 | - |
| 7 | - | 0 | - | - | | | | | | 0 | - |

clockcycle1
First Data
KEEP

| # | Dn[#] | Dpn+1[#] | XORout[#] | XNORout[#] | Sln+1 | IEn | SSn+1 | SEn | Tsn+1 | Dn+1[#] | Clock Gated |
|---|---|---|---|---|---|---|---|---|---|---|---|
| 0 | 1 | 0 | 1 | 1 | 1 | 0 | 1 | 1 | 0 | 1 | Gated |
| 1 | 0 | 1 | 1 | 1 | | | | | | 0 | Gated |
| 2 | 0 | 0 | 0 | 1 | | | | | | 0 | Gated |
| 3 | 0 | 0 | 0 | 1 | | | | | | 0 | Gated |
| 4 | 0 | 0 | 0 | 0 | | | | | | 1 | Toggle |
| 5 | 0 | 1 | 1 | 1 | | | | | | 0 | Gated |
| 6 | 1 | 0 | 1 | 1 | | | | | | 1 | Gated |
| 7 | 0 | 1 | 1 | 1 | | | | | | 0 | Gated |

clockcycle2
SIn+1 | SSn+1=1
DPn+1[1]≠DPn+1[2]
CIRCULAR SHIFT

FIG. 10

DPn+1[0:7]: 10100001(2)/(clockcycle4), 11101111(2)/(clockcycle3), 10100010(2)/(clockcycle2), 01000001(2)/(clockcycle1)

| # | Dn[#] | Dpn+1[#] | XORout[#] | XNORout[#] | SIn+1 | IEn | SSn+1 | SEn | Tsn+1 | Dn+1[#] | Clock Gated |
|---|---|---|---|---|---|---|---|---|---|---|---|
| 0 | 1 | 1 | 0 | 1 | 1 | 1 | 1 | 0 | 1 | 0 | Toggle |
| 1 | 0 | 1 | 1 | 0 | | | | | | 0 | Gated |
| 2 | 0 | 1 | 1 | 0 | | | | | | 0 | Gated |
| 3 | 0 | 1 | 1 | 1 | | | | | | 0 | Gated |
| 4 | 1 | 0 | 1 | 1 | | | | | | 1 | Toggle |
| 5 | 0 | 1 | 1 | 0 | | | | | | 0 | Gated |
| 6 | 1 | 1 | 0 | 1 | | | | | | 0 | Toggle |
| 7 | 0 | 1 | 1 | 0 | | | | | | 0 | Gated |

clockcycle3
SIn+1 | SSn+1=1
DPn+1[0]=DPn+1[1]=DPn+1[2]
INVERT

| # | Dn[#] | Dpn+1[#] | XORout[#] | XNORout[#] | SIn+1 | IEn | SSn+1 | SEn | Tsn+1 | Dn+1[#] | Clock Gated |
|---|---|---|---|---|---|---|---|---|---|---|---|
| 0 | 0 | 1 | 1 | 1 | 0 | 0 | 1 | 0 | 0 | 1 | Toggle |
| 1 | 0 | 0 | 0 | 1 | | | | | | 0 | Gated |
| 2 | 0 | 0 | 0 | 1 | | | | | | 0 | Gated |
| 3 | 0 | 0 | 0 | 1 | | | | | | 0 | Gated |
| 4 | 1 | 0 | 1 | 1 | | | | | | 0 | Toggle |
| 5 | 0 | 1 | 1 | 1 | | | | | | 1 | Toggle |
| 6 | 0 | 0 | 0 | 0 | | | | | | 0 | Gated |
| 7 | 0 | 1 | 1 | 0 | | | | | | 1 | Toggle |

clockcycle4
SIn+1 | SSn+1=1
DPn+1[0] ≠DPn+1[1]=DPn+1[2]
KEEP

FIG. 11

Do[0:7]: 10100001(2)/(clockcycle4'), 00010000(2)/(clockcycle3'), 01010001(2)/(clockcycle2'), 01000001(2)/(clockcycle1')

| # | D0[#] | Tso | Sio | SSo | DDo[#] | Clock Gated |
|---|---|---|---|---|---|---|
| 0 | 1 | 0 | 0 | 0 | 1 | - |
| 1 | 0 | | | | 0 | - |
| 2 | 0 | | | | 0 | - |
| 3 | 0 | | | | 0 | - |
| 4 | 0 | | | | 0 | - |
| 5 | 0 | | | | 0 | - |
| 6 | 1 | | | | 1 | - |
| 7 | 0 | | | | 0 | - |

clockcycle1'
Tso=0
KEEP

| # | D0[#] | Tso | Sio | SSo | DDo[#] | Clock Gated |
|---|---|---|---|---|---|---|
| 0 | 1 | 1 | 0 | 1 | 0 | Toggle |
| 1 | 0 | | | | 1 | Toggle |
| 2 | 0 | | | | 0 | Gated |
| 3 | 0 | | | | 0 | Gated |
| 4 | 1 | | | | 0 | Gated |
| 5 | 0 | | | | 1 | Toggle |
| 6 | 1 | | | | 0 | Toggle |
| 7 | 0 | | | | 1 | Toggle |

clockcycle2'
Tso=1
Do[0]≠Do[1]
CIRCULAR SHIFT

FIG. 12

Do[0:7]: 10100001(2)/(clockcycle4'), 00010000(2)/(clockcycle3'), 01010001(2)/(clockcycle2'), 01000001(2)/(clockcycle1')

| # | DO[#] | Tso | Sio | SSo | DDo[#] | Clock Gated |
|---|---|---|---|---|---|---|
| 0 | 0 | 1 | 1 | 0 | 1 | Toggle |
| 1 | 0 | | | | 1 | Gated |
| 2 | 0 | | | | 1 | Toggle |
| 3 | 0 | | | | 1 | Toggle |
| 4 | 1 | | | | 0 | Gated |
| 5 | 0 | | | | 1 | Gated |
| 6 | 0 | | | | 1 | Toggle |
| 7 | 0 | | | | 1 | Gated |

clockcycle3'
Tso=1
Do[0]=Do[1]
INVERT

| # | DO[#] | Tso | Sio | SSo | DDo[#] | Clock Gated |
|---|---|---|---|---|---|---|
| 0 | 1 | 0 | 0 | 0 | 1 | Gated |
| 1 | 0 | | | | 0 | Toggle |
| 2 | 0 | | | | 0 | Toggle |
| 3 | 0 | | | | 0 | Toggle |
| 4 | 0 | | | | 0 | Gated |
| 5 | 1 | | | | 1 | Gated |
| 6 | 0 | | | | 0 | Toggle |
| 7 | 1 | | | | 1 | Gated |

clockcycle4'
Tso=0
KEEP

SYSTEM ON CHIP

CROSS-REFERENCE TO RELATED APPLICATION

This application claims priority to and the benefit of Korean Patent Application No. 10-2023-0112251, filed in the Korean Intellectual Property Office on Aug. 25, 2023, the entire contents of which are incorporated herein by reference.

BACKGROUND

A system on chip (SoC) is a form of functional block with various existing functions, for example, intellectual property (IP) blocks, intensively implemented on one chip thanks to the development of semiconductor process technology. As electronic devices are becoming lighter, simpler, and more functional, research on enhancing SoC integration and operational speed is also in progress. As SoC integration and operation speed increase, power consumption is an area of ongoing development. When power consumption is high, a temperature of the chip increases, which may lead to not only inoperability but also damage to a package, and thus the importance of low-power design in integrated SoCs is increasing. As one of the low-power design methods in SoC, clock gating technology is applied to a bus interface. By applying the clock gating, power consumption may be improved by reducing operations of devices within the bus interface.

SUMMARY

The present disclosure relates to systems on chips. In general, in some aspects, the present disclosure embodies a system on chip that improves the efficiency of clock gating by reflecting the data pattern characteristics before and after data is processed.

In general, in some other aspects, the present disclosure embodies a system on chip that improves the power consumption efficiency of all flip-flops in a data channel.

In general, in some aspects, the present disclosure relates to a system on chip that includes: a bus including a data channel through which data is transmitted in at least one direction and a master interface configured to receive first data from the data channel, perform a bit operation on the first data and on second data input before input of the first data, determine an encoding operation for the first data based on a result of the bit operation, perform the encoding operation on the first data, to obtain encoded data, and provide the encoded data and a transformation signal indicating the encoding operation to the data channel may be provided.

Some aspects of this disclosure describe system on chip that includes: a bus including a data channel through which data is transmitted in at least one direction and a slave interface configured to receive, from the data channel, encoded data and a transformation signal indicating an encoding operation performed to obtain the encoded data, and performs a maintenance operation, an invert operation, or a circular shift operation on the encoded data based on at least a part of the encoded data and based on the transformation signal may be provided.

Some aspects of this disclosure describe a system on chip that includes: a master interface configured to perform a bit operation on first data and second data input before input of the first data, perform an encoding operation on the first data based on a result of the bit operation, to obtain encoded data, and output the encoded data and a transformation signal indicating the encoding operation, a bus including a data flipflop configured to latch the encoded data based on a clock signal, a clock gating circuit configured to clock-gate the clock signal, and a data channel configured to transmit the encoded data in at least one direction through the data flipflop and a slave interface configured to receive the encoded data and the transformation signal from the bus, and performs a decoding operation on the encoded data based on at least a part of the encoded data and based on the transformation signal may be provided.

BRIEF DESCRIPTION OF THE DRAWINGS

FIG. 2 is a diagram illustrating an example of a bus and an interface of an SoC according to some implementations.

FIG. 8 is a diagram illustrating an example of an encoding operation of a data encoding circuit according to some implementations.

FIGS. 9-10 are diagrams illustrating an example of an encoding operation of a data encoding circuit according to some implementations.

FIGS. 11-12 are diagrams illustrating an example of a decoding operation of a data decoding circuit.

DETAILED DESCRIPTION

Figure 1:
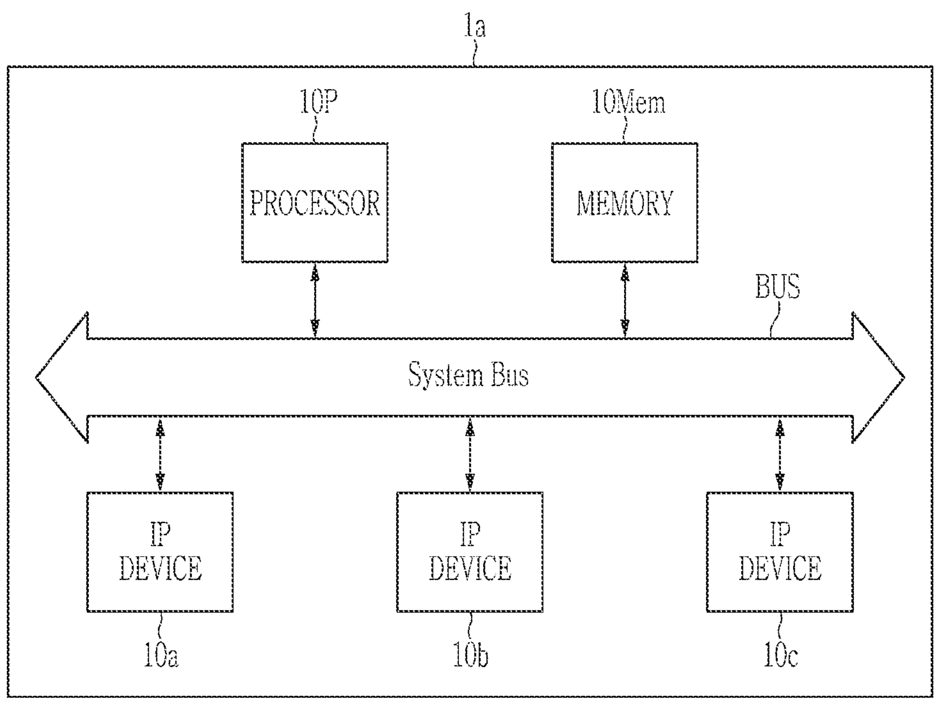
FIG. 1 is a block diagram that illustrates a configuration of an example of a system on chip (SoC) according to some implementations.

Hereinafter, with reference to accompanying drawings, various examples of the present disclosure will be described in detail and thus a person of an ordinary skill can easily practice them in the technical field to which the present disclosure belongs. The present disclosure may be implemented in many different forms and is not limited to the examples described herein.

In order to clearly describe the disclosure with reference to the drawings, parts not related to the description are omitted, and similar reference numerals are designated to similar parts throughout the specification.

In addition, the size and thickness of each component shown in the drawing are arbitrarily represented for the convenience of description, and thus the present disclosure is not necessarily limited to the drawings. In the drawings, the thickness of layers, films, panels, regions, etc., are exaggerated for clarity. In addition, in the drawing, for convenience of description, the thickness of some layers and regions are exaggerated.

In addition, unless explicitly described to the contrary, the word "comprise", and variations such as "comprises" or "comprising", will be understood to imply the inclusion of stated elements but not the exclusion of any other elements.

FIG. 1 is a block diagram that illustrates a configuration of a system on chip (SoC) according to some implementations.

Referring to FIG. 1, an SoC 1*a* is an electronic system integrated into a single chip and may perform various functions by encompassing a plurality of functional blocks with various functions.

The SoC 1*a* may include a processor 10P, a memory 10Mem, a plurality of IP devices 10*a* to 10*c* (sometimes referred to as IP blocks), and a bus BUS.

The processor 10P may include at least one of a microprocessor, a digital signal processor, and logic elements that perform functions similar to functions performed by the microprocessor and the digital signal processor.

The memory 10Mem may be a storage device that stores data and/or instructions, and/or the like. Although not clearly shown, the memory 10Mem is an operating memory for the operation of the processor 10P and may include high-speed DRAM and/or SRAM, and/or the like depending on the implementation.

The plurality of IP devices 10*a* to 10*c* may be circuit blocks performing specific functions in the SoC 1*a*. In some implementations, the plurality of IP devices 10*a* to 10*c* may include a special function register. The processor 10P may process data using the special function register.

The processor 10P, the memory 10Mem, and the plurality of IP devices 10*a* to 10*c* may be connected to each other through the bus BUS. In some implementations, the bus BUS may be an advanced microcontroller bus architecture (AMBA), and the AMBA may be a standard bus specification for connection and management of the plurality of IP devices 10*a* to 10*c* in SoC 1*a*. In some implementations, the bus BUS may be a one-chip communication bus for the design of an embedded microprocessor.

As bus types for the AMBA, an advanced high-performance bus (AHB), an advanced peripheral bus (APB), and an advanced extensible interface (AXI) can be used. Among these, the AXI is an interface protocol between IP devices and may provide multiple outstanding address functions, multiple outstanding transaction functions, and data interleaving functions.

Here, the multiple outstanding address function is a function that allows utilization of empty transmission time occurring between addresses by transmitting the address for each data only once through the address line while simultaneously transmitting each data and transmitting when information is provided through the address line and data line of the bus. In particular, it may be used when providing data in burst mode. In addition, the multiple outstanding transaction function is an in-parallel transaction processing function that makes it possible to transmit a plurality of transactions to a slave device. Accordingly, one of the plurality of transactions can be selected and processed preferentially by the slave device, and read and write operations can be simultaneously executed through the AXI.

The data interleaving function is a function that allows data to be mixed at a slave level when multiple master devices transmit data to one slave. Accordingly, bandwidth use becomes more efficient and latency can be reduced.

FIG. 2 is provided for description of the bus and the interface of the SoC according to some implementations.

Each of the master device 10*m* and slave device 10*s* may be one of the processor 10P, the memory 10Mem, and the plurality of IP devices 10*a* to 10*c* in the SoC 1*a* of FIG. 1. The master device 10*m* is a device that plays a leading role in using the bus BUS, and the master device 10*m* may use the bus BUS. In some implementations, the master device 10*m* may be the processor 10P of FIG. 1, but implementations are not limited thereto, and a other devices within the SoC 1*a* of FIG. 1 may be transferred to/assigned as the master device 10*m* and use the bus BUS.

The slave device 10*s* may play an opposite role to the master device 10*m* and may perform functions in response to a control signal Ctrl led by the master device 10*m*. Accordingly, the slave device 10*s* determines whether the master device 10*m* transmits the control signal Ctrl with respect to the corresponding slave device 10*s* through an address ADDR, and may need to be prepared to take an action in response.

The master device 10*m* and the slave device 10*s* may be connected with the bus BUS through interfaces MI and SI. The master device 10*m* may include a master interface MI and the slave device 10*s* may include a slave interface SI. In cases in which the slave device 10*s* operates as a master, the slave interface SI may become the master interface MI. That is, the master device may change into a slave device, and the slave device may change into a master device depending on an operating situation.

The master device 10*m* according to some implementations may provide write data WD, a transformation signal Ts, and an address ADDR/control signal Ctrl to the slave device 10*s* through the bus BUS, and the slave device 10*s* may provide a write response WR to the master device 10*m*. Although it is not illustrated, the slave device 10*s* may provide read data to the master device 10*m*.

The master interface MI according to some implementations may include a data encoding circuit 110, and the slave interface SI according to some implementations may include a data decoding circuit 120.

The data encoding circuit 110 according to some implementations may perform an encoding operation on data before providing data from the master device 10*m* to the bus BUS. The data encoding circuit 110 may provide encoded data in the form of write data WD to a write data channel CW of the bus BUS. A detailed description of the data encoding circuit 110 will be provided later with reference to FIG. 4 and FIG. 6.

The data decoding circuit 120 may perform decoding operation with respect to the write data WD received from the write data channel CW. The data decoding circuit 120 will be described in detail later with reference to FIG. 5 and FIG. 7. The data encoding circuit 110 and the data decoding circuit 120 may be configured as a data pattern optimizer DPO.

In addition, as shown in FIG. 2, the transformation signal Ts may be provided to the data decoding circuit 120 through the write data channel CW, but implementations are not limited thereto; in some implementations, the transformation signal Ts may be transmitted through other additional channels of the bus BUS besides the write data channel CW.

Although it is not illustrated, the master interface MI and the slave interface SI may include an arbiter, a decoder, and/or the like. Through the arbiter, the master device 10*m* and the slave device 10*s* may request the right to use the bus BUS. Through the decoder, the master device 10*m* may activate the slave device 10*s*, which is a target of the address ADDR.

Figure 3:
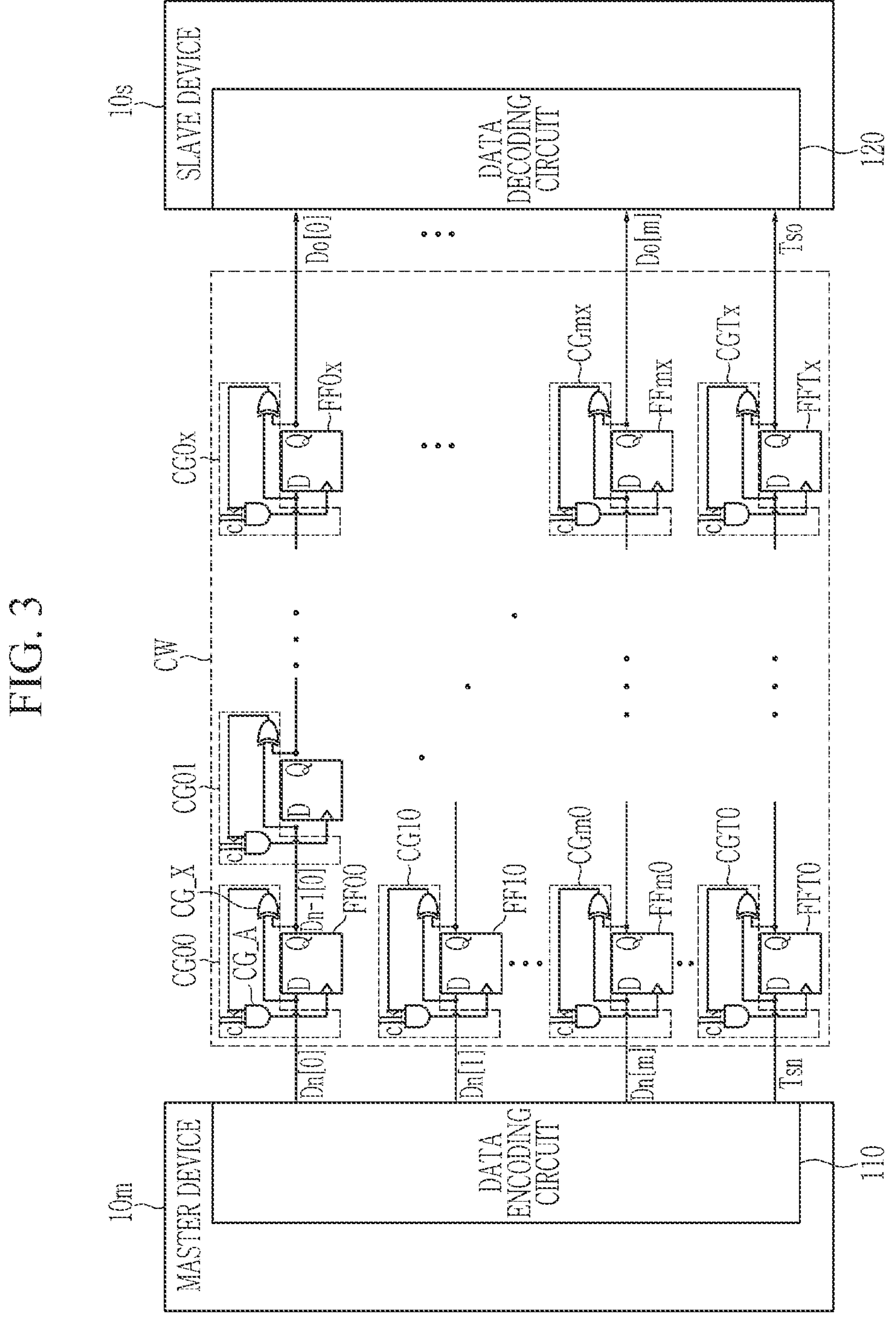
FIG. 3 is a diagram illustrating an example of a data channel according to some implementations.

FIG. 3 is provided for description of the data channel according to some implementations.

Referring to FIG. 2 and FIG. 3, the write data channel CW may include a plurality of data flipflops FF00 to FFTx and a plurality of data clock gating circuits CG00 to CGTx arranged in parallel. In some implementations, the plurality of data flipflops FF00 to FFTx may be arranged in (x+2) rows and (x+1) columns, and the plurality of data clock gating circuits CG00 to CGTx may also be arranged in (x+2) rows and (x+1) columns. The write data channel CW is a data path between the master device 10*m* and the slave device 10*s*, and the SoC 1*a* of FIG. 1 may perform a buffering operation or register slice operation through arrangement of the plurality of data flipflops FF00 to FFTx in the write data channel CW.

An (n_0)th encoded data Dn[0] output from the data encoding circuit 110 may be provided to the data decoding circuit 120 as a 0th output encoded data Do[0] through data flipflops FF00 to FF0*x* of the 0-th row. An (n_m)th encoded data Dn[m] output from the data encoding circuit 110 may be provided to the data decoding circuit 120 as m-th output encoded data Do[m] through data flipflops FFm0 to FF0*mx* of an m-th row. The provision operation for the (n_0)th encoded data Dn[0] and the (n_m)th encoded data Dn[m] may also be applied to the remaining n-th encoded data Dn[0:m].

Likewise, an n-th transformation signal Tsn output from the data encoding circuit 110 may be provided to the data decoding circuit 120 as an output transformation signal Tso through data flipflops FFT0-FFTx of an (m+2)th row.

In addition, the plurality of data flipflops FF00 to FFTx may perform a latch on an n-th encoded data Dn[0:m] and an n-th transformation signal Tsn based on the clock signal clk. Through repeated latch operations, the n-th encoded data Dn[0:m] may be provided to the data decoding circuit 120 as an output encoded data Do[0:m].

The plurality of data clock gating circuits CG00 to CGTx are provided with data of an input stage and data of an output stage to each corresponding data flipflop FF00 to FFTx, and perform a clock gating operation on the clock signal clk input to the plurality of data flipflops FF00 to FFTx.

As an example, a 0_0-th data clock gating circuit CG00 may include a clock gating AND operator CG_A and a clock gating XOR operator CG_X.

The clock gating XOR operator CG_X may provide an XOR operation result value to the clock gating AND operator CG_A based on data of an input terminal and latch data of the 0_0th data flipflop FF00. The clock gating AND operator CG_A gates the XOR bit operation result value and the clock signal clk by performing an AND operation and may provide input as a clock of the data flipflops FF00 to FFTx.

A 0_0th data clock gating circuit CG00 compares (n_0)th encoded data Dn[0] and (n−1_0)th encoded data Dn−1[0], and performs clock gating with respect to the clock signal Clk input to the 0_0th data flipflop FF00.

The description of the 0_0th data clock gating circuit CG00 and the 0_0th data flipflop FF00 may also be applied to the remaining plurality of clock gating circuits CG00 to CGTx and the plurality of data flipflops FF00 to FFTx.

Figure 4:
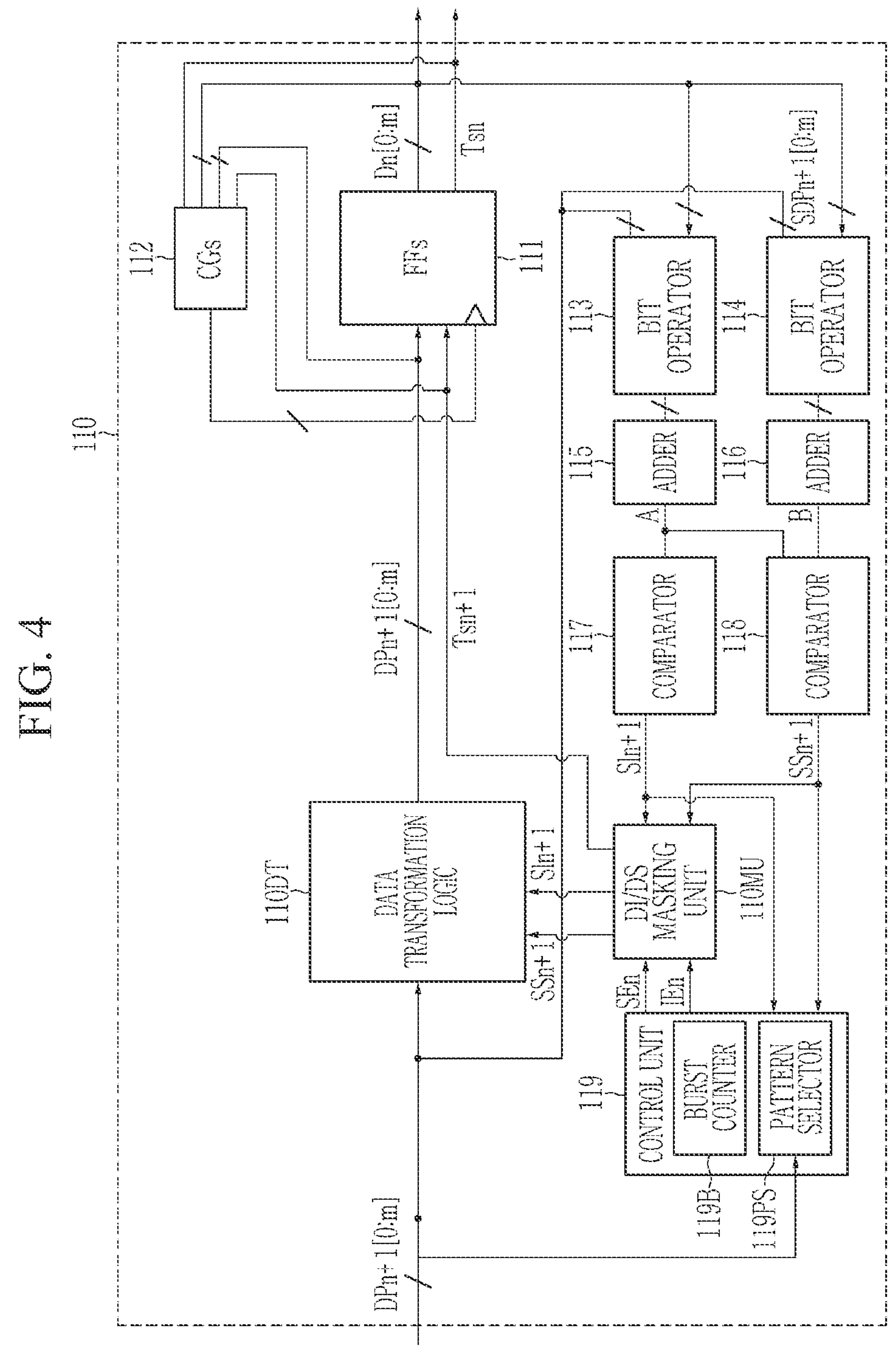
FIG. 4 is a block diagram of an example of a data encoding circuit according to some implementations.

FIG. 4 is a block diagram of the data encoding circuit according to some implementations.

Referring to FIG. 2 and FIG. 4, the data encoding circuit 110 may include a plurality of encoding flipflops 111, a plurality of encoding clock gating circuits 112, a first bit operator 113, a second bit operator 114, a first adder 115, a second adder 116, a first comparator 117, a second comparator 118, an encoding control unit 119, a mask unit 110MU, and a data transformation logic 110DT.

The data encoding circuit 110 may encode an (n+1)th data DP (n+1) [0:m] input through the master interface MI (refer to FIG. 2) to an (n+1) encoded data Dn+1[0:m] by performing an encoding operation, and may provide the (n+1) encoded data Dn+1[0:m] and an (n+1)th transformation signal Ts (n+1) to the write data channel CW.

The plurality of encoding flipflops 111 may latch an n-th encoded data Dn[0:m] and an n-th transformation signal Tsn input before the input of the n-th data DPn 1[0:m].

The plurality of encoding clock gating circuits 112 may perform the clock gating operation with respect to the clock of the plurality of encoding flipflops 111 based on the n-th encoded data Dn[0:m] and the n-th transformation signal Tsn latched to the output terminal of the plurality of encoding flipflops 111 and the (n+1)th encoded data D(n+1) [0:m]) and the (n+1)th transformation signal Ts(n+1) input to the input terminal of plurality of encoding flipflops 111. The descriptions of the plurality of encoding clock gating circuit 112 and the plurality of encoding flipflops 111 may be as provided for the 0_0th data clock gating circuit CG00 and the 0_0th data flipflop FF00 of FIG. 3.

The first bit operator 113 may perform a bit operation for the (n+1)th data DPn+1[0:m] and the n-th encoded data Dn[0:m] latched to the plurality of encoding flipflop 111, and may provide a result of the bit operation to the first adder 115. In some implementations, the bit operation of the first bit operator 113 may be an XOR operation, but the implementations are not limited to that bit operation example. When the bit operation of the first bit operator 113 is an XOR operation and a bit value of each digit of the result value of first bit operator 113 is 1, it means that a bit value corresponding to a position in the (n+1)th data DPn+1[0:m] and a bit value corresponding to a position in the n-th encoded data Dn[0:m] are different from each other.

For example, when an XOR bit operation is formed on random data "1001(2)" and "1101(2)", a result of the bit operation may be "0100(2)". Since a most significant bit (MSB) value of the "1001(2)" and an MSB value of the "1101(2)" are equal to each other, an MSB value of the result value "0100(2)" is 0. Since an MSB-1 bit value of "1001(2)" and an MSB-1 bit value of "1101(2)" are different from each other, an MSB-1 value of the result value "0100(2)" is 1.

The second bit operator 114 may perform a bit operation on (n+1)th shift data SDPn+1[0:m] obtained by performing a circular shift operation on the (n+1)th data DPn+1[0:m] and the n-th encoded data Dn[0:m], and the result value of the bit operation may be provided to the second adder 116. In some implementations, the circular shift operation may be performed in the right direction by 1-bit units, but the shift direction and shift bit unit are not limited thereto.

In some implementations, the bit operation of the second bit operator 114 may be an XNOR operation, but the bit operation is not limited thereto. When the bit operation of the second bit operator 114 is the XNOR operation and a bit value of each digit of the result value of the second bit operator 114 is 1, it means that a bit value of a corresponding digit in the (n+1)th shift data SDPn+1[0:m] and a bit value of a corresponding digit in the n-th encoded data Dn[0:m] equal to each other.

The first adder 115 may generate a first sum value A by bit counting the result value of the first bit operator 113, and provide the first sum value A to the first comparator 117 and the second comparator 118.

The second adder 116 may generate a second sum value B by bit counting the result value of the second bit operator 114 and provide the second sum value B to the second comparator 118.

The first comparator 117 may output an (n+1)th invert signal SIn+1 and provide the (n+1)th invert signal SIn+1 to the mask unit 110MU and the encoding control unit 119 based on the first sum value A and the number of bits m+1 of the (n+1)th data DPn+1[0:m]. For example, the first comparator 117 may perform a comparison operation based on the m+1 value and the size of the first sum value A, and output the (n+1)th invert signal SIn+1 according to the comparison result.

Through the comparison operation of the first comparator 117, the data encoding circuit 110 may predict a clock gating efficiency of the (n+1)th encoded signal Dn+1[0:m] converted by performing an invert operation on the (n+1)th data DPn+1[0:m].

The second comparator 118 may output a (n+1)th shift signal SSn+1 and provide the same to the mask unit 110MU and the encoding control unit 119 based on the first sum value A, the second sum value B, and the nit number m+1 of the (n+1)th data DPn+1[0:m]. For example, the second comparator 118 may perform a comparison operation based on the size of m+1 value, the first sum value A, and the second sum value B, and output the (n+1)th shift signal SSn+1 according to the comparison result.

Through the comparison operation of the second comparator 118, the data encoding circuit 110 in some implementations may predict a clock gating efficiency of an (n+1)th encoding signal Dn+1[0:m] converted by performing a circular shift operation on the (n+1)th data DPn+1[0:m].

The encoding control unit 119 may receive at least a part of the (n+1)th data DPn+1[0:m], the (n+1)th invert signal SIn+1, and the (n+1)th shift signal SSn+1, and may provide an invert enable signal IEn and a shift enable signal SEn to the mask unit 110MU.

The encoding control unit 119 may include a burst counter 119B and a pattern selector 119PS.

The burst counter 119B checks whether a data input/output mode of the master interface MI is a burst mode, and if it is the burst mode, the burst counter 119B may provide the invert enable signal IEn and the shift enable signal SEn of a turn-on level to the mask unit 110MU.

For example, when the burst counter 119B is in the burst mode in which data output of the (n+1)th data DPn+1[0:m] and n-th encoding signal Dn[0:m] is performed continuously with one request, the invert enable signal IEn and the shift enable signal SEn can be set to turn-on level.

On the other hand, burst counter 119B may turn off the invert enable signal IEn and the shift enable signal SEn when the data output of (n+1)th data DPn+1[0:m] and n-th encoding signal Dn[0:m] are performed by different requests.

The pattern selector 119PS may receive at least a part of the (n+1)th data DPn+1[0:m], the (n+1)th invert signal SIn+1, and the (n+1)th shift signal SSn+1, and may determine an encoding operation to be performed on the (n+1)th data DPn+1[0:m]. Depending on the determination, the pattern selector 119PS may turn on/off the invert enable signal IEn and/or shift enable signal SEn.

The conditions for the determination of the pattern selector 119PS may vary depending on the implementation. The pattern selector 119PS will be described in detail, together with a pattern selector 129PS of FIG. 5, later with reference to FIG. 9 to FIG. 12.

In addition to the (n+1)th data DPn+1[0:m], the (n+1)th invert signal SIn+1, and the (n+1)th shift signal SSn+1, the pattern selector 119PS may receive separate control signals such as a special function register (SFR) signal and a signal output from the master device 10*m*. The pattern selector 119PS may turn on/off an invert enable signal IEn and/or shift enable signal SEn at once by the separate control signal.

The pattern selector 119PS in some implementations may turn on/off the invert enable signal IEn and/or shift enable signal SEn according to an operation mode of the master device 10*m*. As an example, the pattern selector 119PS may collectively turn on/off the invert enable signal IEn and/or shift enable signal SEn depending on the operation mode of the master device 10*m*.

Figure 5:
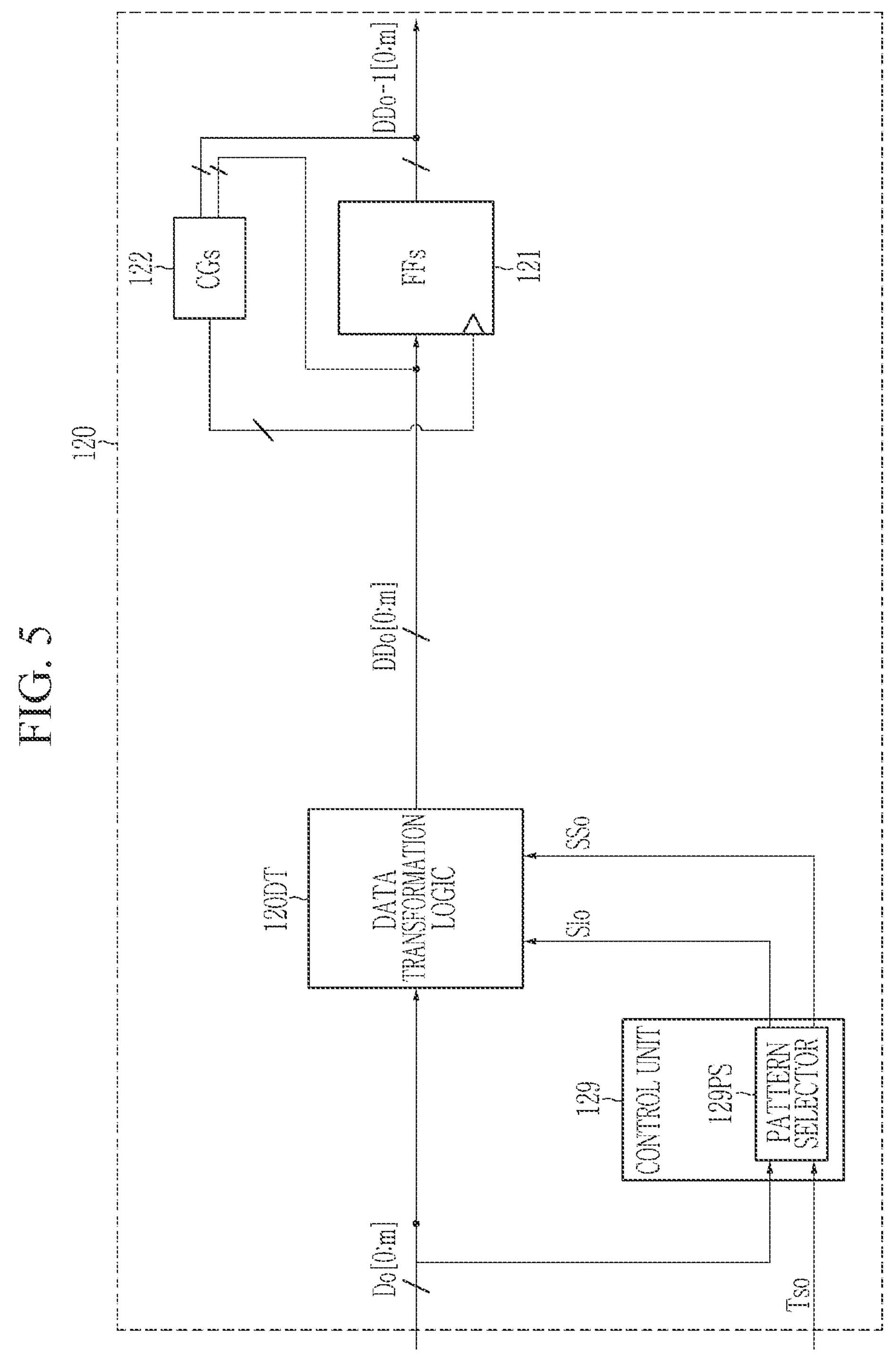
FIG. 5 is a block diagram of an example of a data decoding circuit according to some implementations.

Information on the operation mode of the master device 10*m* may be transmitted to the pattern selector 129PS of FIG. 5. The information on the operation mode may be transmitted in the form of a separate flag bit or a partial pattern of the (n+1)th encoded data Dn+1[0:m] to the pattern selector 129PS of FIG. 5.

The mask unit 110MU may receive the (n+1)th invert signal SIn+1, the (n+1)th shift signal SSn+1, the invert enable signal IEn, and the shift enable signal SEn, and may activate the (n+1)th invert signal SIn+1 and the (n+1)th shift signal SSn+1 based on the invert enable signal IEn and the shift enable signal SEn. The mask unit 110MU may output an (n+1)th transformation signal Tsn+1 based on the activated (n+1)th invert signal SIn+1 and (n+1)th shift signal SSn+1. In some implementations, the output (n+1)th transformation signal Tsn+1 may be 1 bit. Since the number of bits allocated to the transformation signal Ts (refer to FIG. 1) may be 1, a bandwidth output together in parallel with the (n+1)th data DPn+1[0:m] of the present disclosure can be reduced.

The mask unit 110MU may provide the activated (n+1)th invert signal SIn+1 and the (n+1)th shift signal SSn+1 in the form of selection signals to a data transformation logic 110DT. In addition, the mask unit 110MU may provide the (n+1)th transformation signal Tsn+1 output based on the (n+1)th invert signal SIn+1, the (n+1)th shift signal SSn+1, the invert enable signal IEn, and the shift enable signal SEn to the plurality of encoding flipflops 111.

The data transformation logic 110DT may perform a transformation operation on the (n+1)th data DPn+1[0:m] based on the (n+1)th invert signal SIn+1 and the (n+1)th shift signal SSn+1. The transformation operation may include performing one of a maintenance operation, an invert operation, or a circular shift operation on the (n+1)th data DPn+1[0:m]. The transformation operation performed on the (n+1)th data DPn+1[0:m] may be determined based on the (n+1)th invert signal SIn+1 and the (n+1)th shift signal SSn+1.

The data transformation logic 110DT may provide the (n+1)th data DPn+1[0:m] to input terminals of the plurality of encoding flipflops 111 before the transformation operation.

FIG. 5 is a block diagram of the data decoding circuit according to some implementations.

Referring to FIG. 5 together with FIG. 2, the data decoding circuit 120 may include a plurality of decoding flipflops 121, a plurality of decoding clock gating circuits 122, a decoding control unit 129, and the data transformation logic 120DT.

The data decoding circuit 120 may decode output decoded data Do[0:m] input through the slave interface SI (refer to FIG. 2) to decoded data DDo[0:m] by performing a decoding operation.

The plurality of decoding flipflops 121 may receive preceding decoded data DDo−1[0:m] as input before inputting the decoded data DDo[0:m]. The plurality of decoding flipflops 121 may receive and latch the preceding decoded data DDo−1[0:m].

The plurality of decoding clock gating circuits 122 may perform a clock gating operation on the plurality of decoding flipflops 121 based on the preceding decoded data DDo−1[0:m] latched to output terminals of the plurality of decoding flipflops 121 and the decoded data DDo[0:m] input to the input terminals of the plurality of decoding flipflops 121. Description of the plurality of decoding clock gating circuits 122 and the plurality of decoding flipflops 121 may be as provided for the 0_0th data clock gating circuit CG00 and the 0_0th data flipflop FF00 of FIG. 3.

The decoding control unit 129 may receive at least a part of the output encoded data Do[0:m] and the output transformation signal Tso, and output the output invert signal SIo and the output shift signal SSo and provide them to the data transformation unit 120DT.

The decoding control unit 129 may include a pattern selector 129PS. The pattern selector 129PS may receive at least a part of the output encoded data Do[0:m] and the output transformation signal Tso, and may determine a decoding operation to be performed on the output encoded data Do[0:m]. According to the determination, the pattern selector 129PS may output the output invert signal SIo and the output shift signal SSo.

The conditions for the determination of the pattern selector 129PS may vary depending on the implementation. A detailed description of the pattern selector 129PS is provided in reference to the pattern selector 119PS of FIG. 4, together with reference to FIG. 9 to FIG. 12.

The pattern selector 129PS may receive information on the operation mode of the master device 10*m* through at least a part of the output encoded data Do[0:m] and a separate flag bit. In some implementations, the pattern selector 129PS may receive information on the operation mode of the master device 10*m* through at least a part of the output encoded data Do[0:m].

The data transformation logic 120DT may perform a transformation operation for the output encoded data Do[0:m] based on the output invert signal SIo and the output shift signal SSo. The transformation operation may include performing any one of a maintenance operation, an invert operation, or a circular shift operation on the output encoded data Do[0:m]. The transformation operation performed on the output encoded data Do[0:m] can be determined based on the output invert signal SIo and the output shift signal SSo.

Figure 6:
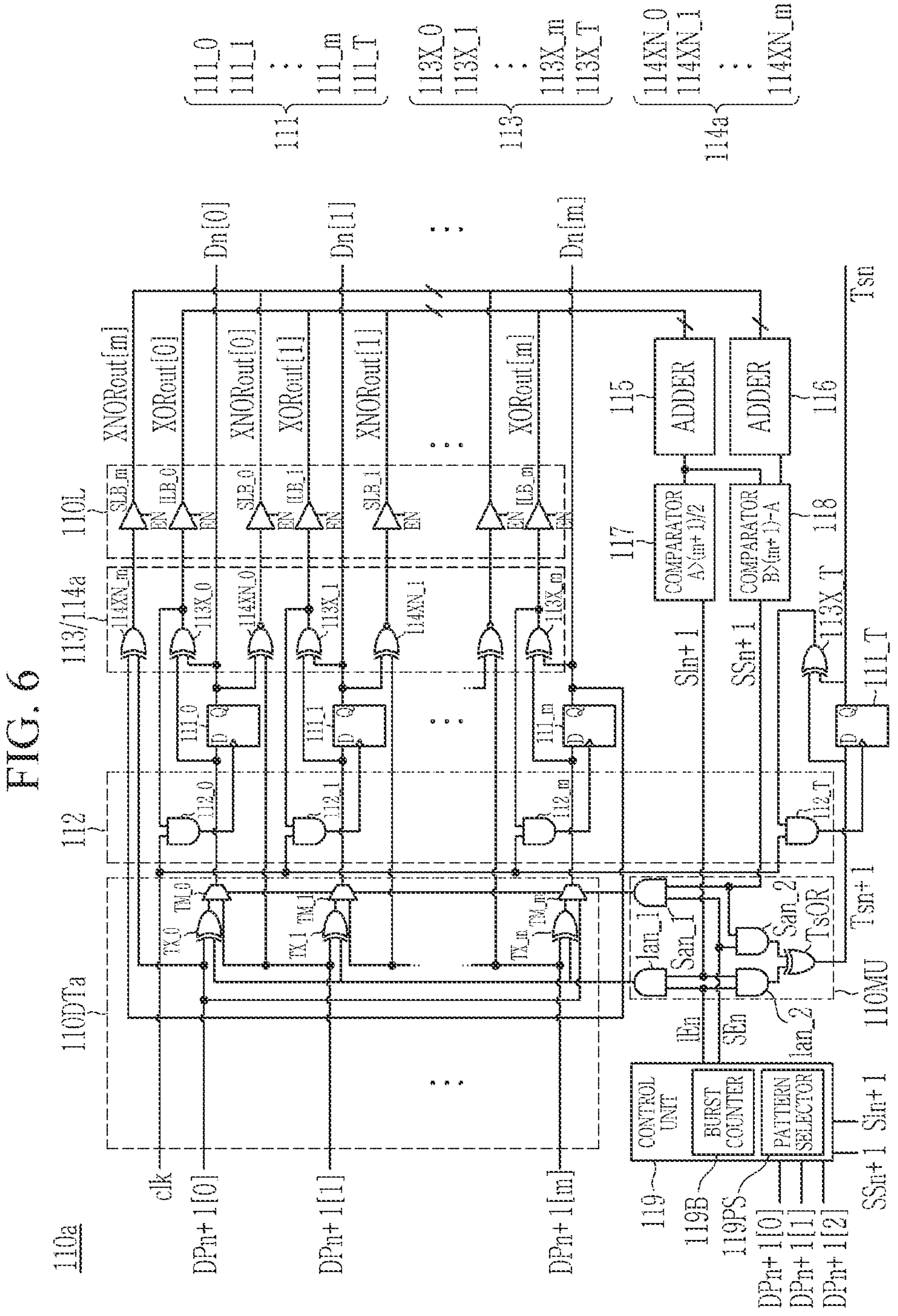
FIG. 6 is a circuit diagram of an example of a a data encoding circuit according to some implementations.

FIG. 6 is a circuit diagram provided for description of a data encoding circuit according to some implementations.

A data encoding circuit 110*a* of FIG. 6 may be in a form implemented according to the example of the data encoding circuit 110 of FIG. 4. Referring to FIG. 4 and FIG. 6, data encoding circuit 110*a* may include a plurality of encoding flipflops 111, a plurality of encoding clock gating circuits 112, a first bit operator 113, a second bit operator 114*a*, a first adder 115, a second adder 116, a first comparator 117, a second comparator 118, an encoding control unit 119, a mask unit 110MU, and a data transformation logic 110DTa.

The plurality of encoding flipflops 111 may include 0th to m-th encoding flipflops 111_0 to 111_*m* and a transformation flipflop 111_T. Each of the 0th to m-th encoding flipflops 111_0 to 111_*m* may respectively receive a bit of an (n+1)th data DPn+1[0:m] or a bit of an (n+1)th encoded data Dn+1[0:m] output through the data transformation logic 110DTa.

For example, the 0th encoding flipflop 111_0 may receive an (n+1_0)th data DPn+1[0] before performing a transformation operation for the (n+1)th data DPn+1[0:m], and may receive an (n+1_0)th encoded data Dn+1[0] after performing the transformation operation for the (n+1_0)th encoded data Dn+1[0].

The transformation flipflop 111_T may receive an (n+1)th transformation signal Tsn+1 output from the mask unit 110MU.

The plurality of encoding clock gating circuits 112 may include 0th to m-th encoding clock gating AND operators 112_0 to 112_*m* and a transformation clock gating AND operator 112_T. A detailed description of the plurality of encoding clock gating circuits 112 is provided along with a description of the first bit operator 113.

The first bit operator 113 may include 0-th to m-th XOR operators 113X_0 to 113X_m and a transformation XOR operator 113_. The 0-th to m-th XOR operators 113X_0 to 113X_m and the transformation XOR operator 113_T may perform an XOR bit operation for the n-th encoded data Dn[0:m] latched to output terminals of the 0th to m-th encoding flipflops 111_0 to 111_*m* and the transformation flipflop 111_T, and an n-th transformation signal Tsn and the n-th encoded data Dn[0:m] and an (n+1)th transformation signal Tsn+1 input to input terminals of the 0-th to m-th encoding flipflops 111_0 to 111_*m*.

The 0-th to m-th XOR operators 113X_0 to 113X_m may provide an XOR result value XORout[0:m], which is a result of the XOR bit operation, to the first adder 115 and the 0-th to m-th encoding clock gating AND operators 112_0 to 112_*m*. The transformation XOR operator 113_T may provide an operation result to the transformation clock gating AND operator 112_T.

For example, the 0th XOR operator 113X_0 performs an XOR operation for the (n_0)th encoded data Dn[0] latched to an output terminal of the 0th encoding flipflop 111_0 and the (n+1_0)th data DPn+1[0] input to an input terminal of the 0-th encoding flipflop 111_0, outputs an 0th XOR result value XORout[0], and provides the 0-th XOR result value XORout[0] to the first adder 115 and a 0th encoding clock gating AND operator 112_0.

The XOR result value XORout[0:m] of the 0th to m-th XOR operators 113X_0 to 113X_m may be transmitted to the first adder 115 through 0th to m-th invert loop prevention buffers ILB_0 to ILB_m. When an enable signal EN is input to the 0th to m-th invert loop prevention buffers ILB_0 to ILB_m, the XOR result value XORout[0:m] may be input to the first adder 115. Through the 0th to m-th invert loop prevention buffers ILB_0 to ILB_m, the data encoding circuit 110*a* may prevent an (n+1)th invert signal SIn+1 and an (n+1)th shift signal SSn+1 output by the XOR result value XORout[0:m] from being feedback due to the XOR result value XORout[0:m].

Each of the 0-th to m-th encoding clock gating AND operators 112_0 to 112_*m* and the transformation clock gating AND operator 112_T may operate as one clock gating circuit with 0th to m-th XOR operators 113X_0 to 113X_m of the first bit operator 113 and the transformation XOR operator 113_T. Descriptions of the 0th to m-th encoding clock gating AND operators 112_0 to 112_*m*, the transformation clock gating AND operator 112_T, the 0-th to m-th XOR operators 113X_0 to 113X_m, and the transformation XOR operator 113_T may be as provided for the 0_0th data clock gating circuit CG00 of FIG. 3.

For example, a 0th to m-th XOR operator 113X_0 may output a 0-th XOR result value XORout[0] by receiving the (n+1_0)th data DPn+1[0], which is input data of the 0-th encoding flipflop 111_0 and the (n+0)th encoded data Dn[0], and may provide the 0-th XOR result value XORout[0] to the 0-th encoding clock gating AND operator 112_0. The 0-th encoding clock gating AND operator 112_0 may perform a clock gating operation for a clock of the 0th encoding flipflop 111_0 based on a clock signal clk and the 0-th XOR result value XORout[0].

The second bit operator 114*a* may include 0th to m-th XNOR operators 114XN_0 to 114XN_m. The 0th to m-th XNOR operators 114XN_0 to 114XN_m may perform an XNOR bit operation for the n-th encoded data Dn[0:m] latched to an output terminal of the 0th to m-th encoding flipflops 111_0 to 111_*m* and data circularly shifted by 1-bit units in the right direction with respect to the (n+1)th data DPn+1[0:m].

The 0-th to m-th XNOR operators 114XN_0 to 114XN_m may provide the XNOR result value XNORout[0:m], which is a result of the XNOR bit operation, to the second adder 116.

For example, the 0th XNOR operator 114XN_0 performs an XNOR operation for (n_0)th encoded data Dn[0] latched to an output terminal of the 0th encoding flipflop 111_0 and an n+1_1 data DPn+1[1] input to an input terminal of the first encoding flipflop 111_1, outputs a 0th XNOR result value XNORout[0], and provides the 0th XNOR result value XNORout[0] to the second adder 116. In addition, the m-th XNOR operator 114XN_m may perform an XNOR operation for an (n_m)th encoded data Dn[m] latched to an output terminal of an m-th encoding flipflop 111_*m* and an (n+1_0) th data DPn+1[0] input to an input terminal of the 0th encoding flipflop 111_0, and may output and provide an m-th XNOR result value XNORout[m] to the second adder 116.

The XNOR result values XNORout[0:m] of the 0th to m-th XNOR operators 114XN_0 to 114XN_m may be transmitted to the second adder 116 through 0th to m-th shift loop prevention buffers SLB_0 to SLB_m. When an enable signal EN is input to the 0th to m-th shift loop prevention buffers SLB_0 to SLB_m, the XNOR result value XNORout [0:m] may be input to the second adder 116. The data encoding circuit 110*a* may prevent the (n+1)th shift signal SSn+1 output by the XNOR result value XNORout[0:m] from being fed back to the XNOR result value XNORout [0:m] through the 0th to m-th shift loop prevention buffers SLB_0 to SLB_m.

The first adder 115 may bit count the XOR result value XORout[0:m], generate a first sum value A, and provide the first sum value A to the first comparator 117 and the second comparator 118.

The second adder 116 may bit count the XNOR result value XNORout[0:m], generate a second sum value B, and provide the second sum value B to the second comparator 118.

In some implementations, the first comparator 117 may output the (n+1)th invert signal SIn+1 based on whether Equation 1 below is satisfied, but operations of the first comparator 117 are not limited thereto. The output (n+1)th invert signal Sin+1 may be provided to the mask unit 110MU and the encoding control unit 119.

$$A > (M)/2 \quad \text{(Equation 1)}$$

In Equation 1, A denotes the first sum value A and M denotes the number of bits of the first data DPn+1[0:m]). Here, M may be m+1. Through the comparison operation of the first comparator 117, the data encoding circuit 110 in some implementations performs an invert operation on the (n+1)th data DPn+1[0:m] to predict a clock gating efficiency of the converted (n+1)th encoding signal Dn+1[0:m].

In some implementations, the second comparator 118 may output the (n+1)th shift signal SSn+1 based on whether Equation 2 below is satisfied, but operations of the second operator 118 are not limited thereto. The output (n+1)th shift signal SSn+1 may be provided to the mask unit 110MU and the encoding control unit 119.

$$B > M - A \quad \text{(Equation 2)}$$

In Equation 2, A denotes the first sum value A, B denotes the second sum value B, and M is the number of bits of the first data DPn+1[0:m]. Here, M may be m+1. The second comparator 118 calculates based on the first sum value A, the second sum value B, and the number of bits m+1 of (n+1)th data DPn+1[0:m] to thereby predict the clock gating efficiency of the (n+1)th encoding signal Dn+1[0:m] transformed by performing a circular shifting operation on the (n+1)th data DPn+1[0:m].

In some implementations, the encoding control unit 119 may receive the (n+1_0)th to (n+1_2)th data DPn+1[0:2]), the (n+1)th invert signal SIn+1, and the (n+1)th shift signal SSn+1, and may output and provide an invert enable signal IEn and a shift enable signal SEn to the mask unit 110MU.

The encoding control unit 119 may include a burst counter 119B and a pattern selector 119PS.

The burst counter 119B checks whether a data input/output mode of the master interface MI is a burst mode, and if it is a burst mode, sets the invert enable signal IEn and the shift enable signal SEn to a turn-on level and provides the enable signal IEn and the shift enable signal SEn in the turn-on level to the mask unit 110MU. When an output of the (n+1)th data DPn+1[0:m] and an data output of the n-th encoding signal Dn[0:m] are performed by different requests, the burst counter 119B may set the invert enable signal IEn and the shift enable signal SEn to a turn-off level.

In some implementations, the pattern selector 119PS receives (n+1_0)th to (n+1_2)th data DPn+1[0:2], the (n+1) th invert signal SIn+1, and the (n+1)th shift signal SSn+1, and may determine an encoding operation to be performed on the (n+1)th data DPn+1[0:m]. According to the determination, the pattern selector 119PS may set the invert enable signal IEn and/or shift enable signal SEn to an enable/turn-off level.

For example, the pattern selector 119PS may perform an OR operation for the (n+1)th invert signal SIn+1 and the (n+1)th shift signal SSn+1, and may output the invert enable signal IEn and/or shift enable signal SEn according to a pattern of the (n+1_0)th to (n+1_2)th data DPn+1[0:2].

For example, when a value of the OR operation for the (n+1)th invert signal SIn+1 and the (n+1)th shift signal SSn+1 is "1" and the (n+1_1)th data DPn+1[1] and the (n+1_2)th data DPn+1[2] are different from each other, the pattern selector 119PS may set the invert enable signal IEn to a turn-off level and the shift enable signal SEn to a turn-on level. When the OR operation value for the (n+1)th invert signal SIn+1 and the (n+1)th shift signal SSn+1 is "1" and the (n+1_0)th data DPn+1[0], the (n+1_1)th data DPn+1[1], and the (n+1_2)th data DPn+1[2] are all the same, the pattern selector 119PS may set the invert enable signal IEn to a turn-on level and the shift enable signal SEn to a turn-off level. When the OR operation value for the (n+1)th invert signal SIn+1 and the (n+1)th shift signal SSn+1 is "1" and the (n+1_1)th data DPn+1[1] and the (n+1_2)th data DPn+1[2] are the same and only the (n+1_0)th data DPn+1[0] is different, the pattern selector 119PS may set both the invert enable signal IEn and the shift enable signal SEn to a turn-off level.

This pattern of the (n+1)th data DPn+1[0:m] and outputs of the invert enable signal IEn and the shift enable signal SEn according to the (n+1)th invert signal SIn+1 and the (n+1)th shift signal SSn+1 are described as an example, and the scope of implementations according to the present disclosure is not limited to that pattern.

Figure 7:
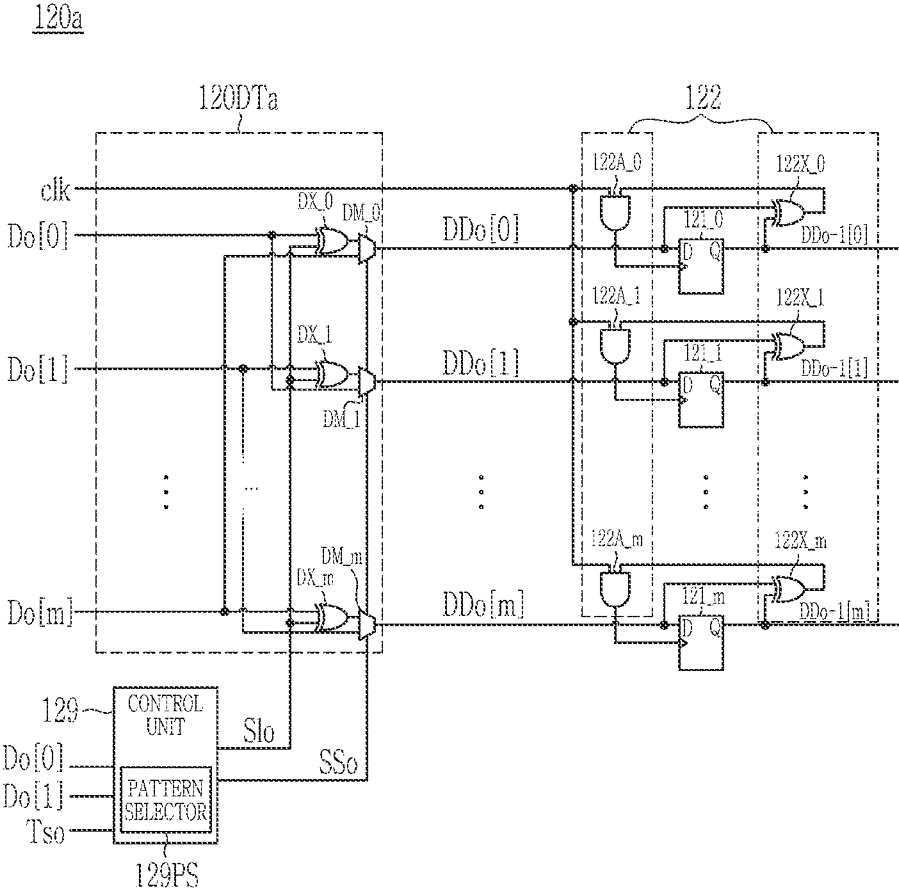
FIG. 7 is a circuit diagram of an example of a data decoding circuit according to some implementations.

The pattern selector 119PS is described in additional detail with reference to FIG. 9 to FIG. 12 and with reference to the pattern selector 129PS of FIG. 7.

The pattern selector 119PS shown in FIG. 6 receives the (n+1_0)th to (n+1_2)th data DPn+1[0:2]) among the (n+1)th data DPn+1[0:m] and outputs the invert enable signal IEn and/or shift enable signal SEn based on the received data. However, the input data to the pattern selector 119PS from among the (n+1)th data DPn+1[0:m] is not limited to this example.

In some implementations, the mask unit 110MU may include first and second invert AND operators Ian_1 and Ian_2, first and second shift AND operators San_1 and San_2, and a transformation OR operator TsOR.

The first invert AND operator Ian_1 and the second invert AND operator Ian_2 may receive the invert enable signal IEn and the (n+1)th invert signal SIn+1. The first invert AND operator Ian_1 may provide an AND operation result of the invert enable signal IEn and the (n+1)th invert signal SIn+1 to a data transformation unit 110DTa. The second invert AND operator Ian_2 may provide an AND operation result of the invert enable signal IEn and the (n+1)th invert signal SIn+1 to a transformation OR operator TsOR. The first invert AND operator Ian_1 may determine activation of the (n+1)th invert signal SIn+1 through an AND operation with the invert enable signal IEn. The first invert AND operator Ian_1 may output the activated (n+1)th invert signal SIn+1.

The first and second shift AND operators San_1 and San_2 may receive the shift enable signal SEn and the (n+1)th shift signal SSn+1. The first shift AND operator San_1 may provide an AND operation result of the shift enable signal SEn and the (n+1)th shift signal SSn+1 to the data transformation unit 110DTa. The second shift AND operator San_2 may provide an AND operation result of the shift enable signal SEn and the (n+1)th shift signal SSn+1 to the transformation OR operator TsOR. The first shift AND operator San_1 may determine activation of the (n+1)th shift signal SSn+1 through an AND operation with the shift enable signal SEn. The first shift AND operator San_1 may output the activated (n+1)th shift signal SSn+1.

The transformation OR operator TsOR may output an (n+1)th transformation signal Tsn+1 based on an operation result of the second invert AND operator Ian_2 and the second shift AND operator San_2. The transformation OR operator TsOR may output the (n+1)th transformation signal Tsn+1 that considers activation of the (n+1)th invert signal SIn+1 and the (n+1)th shift signal SSn+1 based on an operation result of the second invert AND operator Ian_2 and an operation result of the second shift AND operator San_2.

The output (n+1)th transformation signal Tsn+1 may be 1 bit. Since the number of bits allocated to the transformation signal Ts (refer to FIG. 1) can be 1, a bandwidth output in parallel with the (n+1)th data DPn+1[0:m] of the present disclosure can be reduced.

In addition, the (n+1)th transformation signal Tsn+1 is a signal output from the OR operation of the activated (n+1)th invert signal SIn+1 and the activated (n+1)th shift signal SSn+1, and when one of the (n+1)th invert signal SIn+1 and the (n+1)th shift signal SSn+1 is activated, the (n+1)th transformation signal Tsn+1 may be activated. For example, when a value of one of the (n+1)th invert signal SIn+1 and the (n+1)th shift signal SSn+1 is "1", a value of the (n+1)th transformation signal Tsn+1 may be "1".

However, when both the (n+1)th invert signal Sin+1 and the (n+1)th shift signal SSn+1 are deactivated, the (n+1)th transformation signal Tsn+1 may be deactivated. For example, when values of the (n+1)th invert signal SIn+1 and the (n+1)th shift signal SSn+1 are "0", the value of the (n+1)th transformation signal Tsn+1 may be "O".

The data transformation unit 110DTa may perform an encoding operation of any one of a maintenance operation, an invert operation, or a circular shift operation for the (n+1)th data DPn+1[0:m] based on the (n+1)th invert signal SIn+1 and the (n+1)th shift signal SSn+1.

In some implementations, the data transformation unit 110DTa may include 0-th to m-th transformation XOR operators TX_1 to TX_m and 0-th to m-th transformation MUXs TM_0 to TM_m. Each of the 0-th to m-th transformation XOR operators TX_1 to TX_m may receive the (n+1)th data DPn+1[0:m] and (n+1)th invert signal SIn+1 and perform an XOR bit operation.

For example, the 0-th transformation XOR operator TX_0 may receive the (n+1_0)th data DPn+1[0] and the (n+1)th invert signal SIn+1. When the received (n+1)th invert signal SIn+1 is "0", the 0-th transformation XOR operator TX_0 may output the (n+1_0)th data DPn+1[0] as it is, and when the received (n+1)th invert signal SIn+1 is "1", the 0-th transformation XOR operator TX_0 may invert and output the (n+1_0)th data DPn+1[0]. In some implementations, the value of the (n+1)th transformation signal Tsn+1 may be "1".

Each of the 0th to m-th transformation MUXs TM_0 to TM_m may receive a result value of each of the 0th to m-th transformation XOR operators TX_1 to TX_m and each data circularly shifted in 1-bit units in the right direction with respect to the (n+1)th data DPn+1[0:m], and may receive the (n+1)th shift signal SSn+1 as a selection signal. Each of the 0th to m-th transformation MUXs TM_0 to TM_m may output any one of the result value of each of the 0th to m-th transformation XOR operators TX_1 to TX_m and the circularly shifted data based on the (n+1)th shift signal SSn+1.

For example, the 0th MUX TM_0 may receive a result value of the 0th transformation XOR operator TX_0 and the (n+1_1)th data DPn+1[1], and may receive the (n+1)th shift signal SSn+1 as a selection signal. When the received (n+1)th shift signal SSn+1 is "0", the 0th transformation MUX TM_0 outputs a result value of the 0th transformation XOR operator TX_0 and provides the output result value to the 0th encoding flipflop 111_0. When the received (n+1)th shift signal SSn+1 is "1", the 0th transformation MUX TM_0 may output the (n+1_1)th data DPn+1[1] and provide the output data to the 0th encoding flipflop 111_0.

In addition, the m-th transformation MUX TM_m may receive a result value of the mth transformation XOR operator TX_m and the (n+1_0)th data DPn+1[0], and may receive the (n+1)th shift signal SSn+1 as a selection signal. When the (n+1)th shift signal SSn+1 is "0", the m-th transformation MUX TM_m may output a result value of the m-th transformation XOR operator TX_m and provide the output result value to the m-th encoding flipflop 111_*m*. When the (n+1)th shift signal SSn+1 is "1", the 0th transformation MUX TM_m may output the (n+1_0)th data DPn+1[0] and provide the output data to the m-th encoding flipflop 111_*m*.

The data transformation unit 110DTa outputs the (n+1)th encoded data Dn+1[0:m] on which any one of a maintenance operation, an invert operation, or a circular shift operation for the (n+1)th data DPn+1[0:m] based on the (n+1)th invert signal SIn+1 and the (n+1)th shift signal SSn+1, and provides the output encoded data to the plurality of encoding flipflops 111.

Accordingly, the (n+1)th transformation signal Tsn+1 output based on the activated (n+1)th invert signal SIn+1 and (n+1)th shift signal SSn+1 may include encoding operation information with respect to the (n+1)th data DPn+1[0:m].

In addition, the data transformation unit 110DTa may control the (n+1)th invert signal SIn+1 and the (n+1)th shift signal SSn+1 before performing the encoding operation, and provides (n+1)th data DPn+1[0:m] to an input terminal of each of the 0th to m-th encoding flipflops 111_0 to 111_*m*. Before the encoding operation of the data transformation unit 110DTa, first bit operator 113 may output the XOR result value XORout[0:m] based on the provided (n+1)th data DPn+1[0:m]. the (n+1)th transformation signal Tsn+1 may indicate whether any one of an invert operation, or a circular shift operation for the (n+1)th data DPn+1[0:m] is performed.

FIG. 7 is a circuit diagram provided for description of a data decoding circuit according to some implementations.

A data decoding circuit 120*a* of FIG. 7 is an example of the data decoding circuit 120 of FIG. 5. Referring to FIG. 5 and FIG. 7, the data decoding circuit 120*a* may include a plurality of decoding flipflops 121, a plurality of decoding clock gating circuits 122, a decoding control unit 129, and a data transformation logic 120DTa.

The plurality of decoding flipflops 121 may include 0th to m-th decoding flipflops 121_0 to 121_*m*. Each of the 0th to m-th decoding flipflops 121_0 to 121_*m* may receive a bit of decoded data DDo[0:m] output through the data transformation logic 120DTa through an input terminal, and may latch preceding decoded data DDo−1[0:m] to an output terminal. For example, the 0th decoding flipflops 121_0 may receive 0th decoded data DDo[0] through an input terminal and latch 0th preceding decoded data DDo−1[0] to an output terminal.

The plurality of decoding clock gating circuits 122 may include 0th to m-th decoding clock gating AND operators 122A_0 to 122A_m and 0th to m-th decoding clock gating XOR operators 122X_0 to 122X_m.

The 0th to m-th decoding clock gating XOR operators 122X_0 to 122X_m may provide XOR operation result value to the 0th to m-th decoding clock gating AND operators 122A_0 to 122A_m based on data at the input terminals of the 0th to m-th decoding flipflops 121_0 to 121_*m* and latch data at the output terminals of the 0th to m-th decoding flipflops 121_0 to 121_*m*. The 0th to m-th decoding clock gating AND operators 122A_0 to 122A_m may gate the XOR operation result value and a clock signal clk by performing an AND operation and input as a clock of the 0th to m-th decoding flipflops 121_0 to 121_*m*.

For example, the 0th decoding clock gating XOR operator 122X_0 may provide an XOR operation result value to the 0th decoding gating AND operator 122A_0 based on the 0th decoded data DDo[0] and the 0th preceding decoded data DDo−1[0] latched to the 0th decoding flipflops 121_0. The 0th decoding gating AND operator 122A_0 may gate the XOR operation result value and the clock signal clk by performing an AND operation, and provide input as a clock of the 0th decoding flipflops 121_0.

The plurality of decoding clock gating circuits 122 compare each decoded data DDo[0:m] and the preceding decoded data DDo−1[0:m] latched to the 0th to m-th decoding flipflops 121_0 to 121_*m*, and may perform clock gating with respect to the clock signal clk input to the 0th to m-th decoding flipflops 121_0 to 121_*m*.

The decoding control unit 129 may receive the 0th and first output encoded data Do[0:1], which are adjacent bits among the output encoded data Do[0:m] and an output transformation signal Tso, and may output an output invert signal SIo and an output shift signal SSo based on the 0th and first output encoded data Do[0:1] and the output transformation signal Tso and provide the output invert signal SIo and the output shift signal SSo to the data transformation unit 120DTa.

The decoding control unit 129 may include a pattern selector 129PS. The pattern selector 129PS may determine a decoding operation to be performed on the output encoded data Do[0:m] based on the 0th and first output encoded data Do[0:1] and the output transformation signal Tso. According to the determination, the pattern selector 129PS may turn on/off the output invert signal SIo and/or the output shift signal SSo.

For example, when a value of the output transformation signal Tso is "0", the pattern selector 129PS turns off both the output invert signal SIo and the output shift signal SSo such that that the operation for the output encoded data Do[0:m] may be determined as a maintenance operation. When a value of the output transformation signal Tso is "1" and the 0th and first output encoded data Do[0:1] are different from each other, the pattern selector 129PS turns off the output invert signal SIo and turns on the output shift signal SSo such that the decoding operation for the output encoded data Do[0:m] can be determined as a shift operation. When a value of the output transformation signal Tso is "1" and the 0th and first output encoded data Do[0:1] are equal to each other, the pattern selector 129PS turns on the output invert signal SIo and turns off the output shift signal SSo such that the decoding operation for the output encoded data Do[0:m] may be determined as an invert operation.

The operation of the pattern selector 129PS is described in detail with reference to FIG. 9 to FIG. 12 and in reference to the pattern selector 119PS of FIG. 6.

The pattern selector 129PS may receive the 0th and first output encoded data Do[0:1] among the output encoded data Do[0:m] and output the output invert signal Slo and the output shift signal SSo based on the 0th and first output encoded data Do[0:1]. In some implementations, the data input from among the output encoded data Do[0:m] is not limited to Do[0:1] but can be other data from among the output encoded data Do[0:m].

The data transformation unit 120DTa may perform an encoding operation among any one of a maintenance operation, an invert operation, or a circular shift operation for the output encoded data Do[0:m] based on the output invert signal SIo and the output shift signal SSo.

In some implementations, the data transformation unit 120DTa may include 0th and m-th decoding XOR operators DX_0 to DX_m and 0th and m-th decoding MUXs DM_0 to DM_m. Each of the 0th and m-th decoding XOR operators DX_0 to DX_m may receive the output encoded data Do[0:m] and the output invert signal SIo, and perform an XOR bit operation.

For example, the 0th decoding XOR operator DX_0 may receive 0th output encoded data Do[0] and the output invert signal SIo. When the output invert signal SIo is "0", the 0th decoding XOR operator DX_0 outputs the 0th output encoded data Do[0] as it is, and when the output invert signal SIo is "1", the 0th decoding XOR operator DX_0 may invert and output the 0th output encoded data Do[0].

Each of the 0th and m-th decoding MUXs DM_0 to DM_m may receive a result value of each of the 0th to m-th decoding XOR operators DX_0 to DX_m and data circularly shifted to 1 bit unit in the left direction with respect to the output encoded data Do[0:m], and may receive the output shift signal SSo as a selection signal. Each of the 0th and m-th decoding MUXs DM_0 to DM_m may output any one of the result value of the 0th and m-th decoding XOR operators DX_0 to DX_m and the circularly shifted data based on the output shift signal SSo.

For example, the 0th decoding MUX DM_0 may receive a result value of the 0th decoding XOR operator DX_0 and the m-th output encoded data Do[m], and receive the output shift signal SSo as a selection signal. When the output shift signal SSo is "0", the 0th decoding MUX DM_0 may output a result value of the 0th decoding XOR operator DX_0 and provide to the 0th decoding flipflops 121_0. When the output shift signal SSo is "1", the 0th decoding MUX DM_0 may output the m-th output encoded data Do[m] and provide to the 0th decoding flipflops 121_0.

In addition, the first decoding MUX DM_1 may receive a result value of the first decoding XOR operator DX_m and the 0th output encoded data Do[0], and receive the output shift signal SSo as a selection signal. When the output shift signal SSo is "0", the first decoding MUX DM_1 outputs a result value of the first decoding XOR operator DX_m and provide to the first decoding flipflops 121_1. When the output shift signal SSo is "1", the first decoding MUX DM_1 outputs the 0th output encoded data Do[0] and provide to the first decoding flipflops 121_1.

The data transformation unit 120DTa may output decoded data Do[0:m] on which any one of the maintenance operation, the invert operation, or the circular shift operation with respect to the output encoded data Do[0:m] has been performed, and provide the output decoded data Do[0:m] to the plurality of decoding flipflops 121 based on the output invert signal SIo and the output shift signal SSo FIG. 8 is provided for description of an example of an encoding operation of the data encoding circuit according to some implementations. FIG. 8 shows an example of an operation of the data encoding circuit 110*a* of FIG. 6 when the invert enable signal IEn and the shift enable signal SEn are set to the turn-on level and the (n+1)th data DPn 1[0:7], where m is 7, is input three times in succession, Referring to FIG. 6 and FIG. 8, the data encoding circuit 110*a* may receive "11101011 2" as an (n+1)th data DPn+1 [0:7] for a first clock cycle clockcycle1, "11101010 2" for a second clock cycle clockcycle2, and "00001110 2" for a third clock cycle clockcycle3.

Since the n-th encoded data Dn[0:7] is not latched in the first clock cycle clockcycle1, the first bit operator 113 and the second bit operator 114*a* may not normally output an XOR result value XORout[0:7] and an XNOR result value XNORout[0:7]. Thus, "11101011 2" input to an input terminal of the plurality of encoding flipflops 111 before the transformation operation of the data transformation logic 110DTa may be latched to an output terminal of the plurality of encoding flipflops 111 based on the clock signal clk.

"11101011 2" may be latched as the n-th encoded data Dn[0:7] to the output terminal of the plurality of encoding flipflops 111 in the second clock cycle clockcycle2, and "00001110 2" may be input as the (n+1)th data DPn+1[0:7] to the input terminal of the plurality of encoding flipflops 111. The XOR result value XORout[0:7] may be "11100101 2" and the XNOR result value XNORout[0:7] may be "00010011 2". Accordingly, the first sum value A may be 5 and the second sum value B may be 3.

Thus, the first comparator 117 may output by setting the (n+1)th invert signal Sin+1 to the turn-on level, and the second comparator 118 may output by setting the (n+1)th shift signal SSn+1 the turn-off level. The mask unit 110MU may output by setting the (n+1)th transformation signal Tsn+1 to the turn-on level, assuming that the invert enable signal IEn and shift enable signal SEn are set to the turn-on level.

The data transformation logic 110DTa may perform an invert operation for the "00001110(2)" in the second clock cycle clockcycle2 and may output "11110001(2)" as the (n+1)th encoded data Dn+1[0:7]. The data transformation logic 110DTa may provide "1110001(2)" to the input terminal of the plurality of encoding flipflops 111. "11110001 (2)" input to the input terminal of plurality of encoding flipflops 111 may be latched to the output terminal of plurality of encoding flipflops 111 based on the clock signal clk.

"11110001(2)" may be latched as the n-th encoded data Dn[0:7] to the output terminal of the plurality of encoding flipflops 111 in the third clock cycle clockcycle3, and "11101010(2)" may be input as the (n+1)th data DPn+1[0:7] to the input terminal of the plurality of encoding flipflops 111. The XOR result value XORout[0:7] may be "00011011 (2)" and the XNOR result value XNORout[0:7] may be "01111011(2)". Accordingly, the first sum value A may be 4 and the second sum value B may be 6.

Thus, the first comparator 117 may turn off the (n+1)th invert signal SIn+1 and output, and the second comparator 118 may turn on the (n+1)th shift signal SSn+1 and output. The mask unit 110MU may output by setting the (n+1)th transformation signal Tsn+1 to the turn-on level, assuming that the invert enable signal IEn and the shift enable signal SEn are set to the turn-on level.

In the third clock cycle clockcycle3, the data transformation logic 110DTa may perform a circular shift operation of 1 bit units in the right direction with respect to "11101010 (2)", and may output "01110101(2)" as the (n+1)th encoded data Dn+1[0:7]. The data transformation logic 110DTa may provide "01110101(2)" to the input terminal of the plurality of encoding flipflops 111. "01110101(2)" input to the input terminal of the plurality of encoding flipflops 111 may be latched to the output terminal of the plurality of encoding flipflops 111 based on the clock signal clk.

The data encoding circuit 110*a* may receive the (n+1)th data DPn+1[0:7] in the order of "11101011(2)", "00001110 (2)", and "11101010(2)" in the first to third clock cycles clockcycle1 to clockcycle3. The data encoding circuit 110*a* may output the (n+1)th data DPn+1[0:7] in the order of "11101011(2)", "11110001(2)", and "01110101(2)" and may output the (n+1)th transformation signal Tsn+1 in the order of "0(2)", "1(2)", and "1(2)" in the first to third clock cycles clockcycle1 to clockcycle3.

FIG. 9 to FIG. 10 are provided for description of an example of the encoding operation of the data encoding circuit. FIG. 9 to FIG. 10 are provided for description of the operation of the data encoding circuit 110*a* of FIG. 6 when the (n+1)th data DPn+1[0:7], where m is 7, is input four times in succession.

Referring to FIG. 6, FIG. 9, and FIG. 10, the data encoding circuit 110*a* may receive "01000001(2)" as the (n+1)th data DPn+1[0:7] in the first clock cycle clockcycle1, "10100010(2)" in the second clock cycle clockcycle2, "11101111(2)" in the third clock cycle clockcycle3, and "10100001(2)" in the fourth clock cycle clockcycle4.

In addition, as described with reference to FIG. 6, the pattern selector 119PS performs an OR operation for the (n+1)th invert signal SIn+1 and the (n+1)th shift signal SSn+1, and may output the invert enable signal IEn and/or shift enable signal SEn according to patterns of (n+1_0)th to (n+1_2)th data DPn+1[0:2].

In some implementations, when a value of the OR operation for the (n+1)th invert signal SIn+1 and the (n+1)th shift signal SSn+1 is "1" and the (n+1_1)th data DPn+1[1] and the (n+1_2)th data DPn+1[2] are different from each other, the pattern selector 119PS may turn off the invert enable signal IEn and set the shift enable signal SEn on the turn-on level. When a value of the OR operation for the (n+1)th invert signal SIn+1 and the (n+1)th shift signal SSn+1 is "1" and the (n+1_1)th data DPn+1[1] and the (n+1_2)th data DPn+1[2] are the same, the pattern selector 119PS may set the invert enable signal IEn on the turn-on level and turn off the shift enable signal SEn. When a value of the OR operation for the (n+1)th invert signal SIn+1 and the (n+1)th shift signal SSn+1 is "1" and the (n+1_1)th data DPn+1[1] and the (n+1_2)th data DPn+1[2] are the same and only the (n+1_0)th data DPn+1[0] is different, the pattern selector 119PS may turn off both the invert enable signal IEn and the shift enable signal SEn.

Since the n-th encoded data Dn[0:7] is not latched in the first clock cycle clockcycle1, the first bit operator 113 and the second bit operator 114*a* may not normally output the XOR result value XORout[0:7] and the XNOR result value XNORout[0:7]. Thus, before the transformation operation of the data transformation logic 110DTa, "01000001(2)" input to the input terminal of the plurality of encoding flipflops 111 may be latched to the output terminal of the plurality of encoding flipflops 111 based on the clock signal clk. Since the invert operation and the circular shift operation are not performed in the data transformation logic 110DTa, the mask unit 110MU may turn off (e.g., set to a turn-off level) and output the (n+1)th transformation signal Tsn+1.

"01000001(2)" may be latched as the n-th encoded data Dn[0:7] to the output terminal of the plurality of encoding flipflops 111 in the second clock cycle clockcycle2, and "10100010(2)" may be latched as the n-th encoded data Dn[0:7] to the input terminal of the plurality of encoding flipflops 111. The XOR result value XORout[0:7] may be "11100011(2)" and the XNOR result value XNORout[0:7] may be "11101111(2)". Accordingly, the first sum value A may be 5 and the second sum value B may be 7.

Thus, the first comparator 117 may set the (n+1)th invert signal SIn+1 to the turn-on level and output, and the second comparator 118 may set the (n+1)th shift signal SSn+1 to the turn-on level and output. Since the OR operation result value of the (n+1)th invert signal SIn+1 and the (n+1)th shift signal SSn+1 is "1", a value of an (n+1_1)th data DPn+1[1] is "1", and a value of an (n+1_2)th data DPn+1[1] is "0", that is they are different from each other, the pattern selector 119PS may turn off the invert enable signal IEn and may set the shift enable signal Sen to the turn-on level. The mask unit 110MU may set the (n+1)th transformation signal Tsn+1 to the turn-on level and output.

In the second clock cycle clockcycle2, the data transformation logic 110DTa receives an activated (n+1)th shift signal SSn+1, and may output "01010001(2)" by circularly shifting "10100010(2)" in 1 bit units in the right direction. The data transformation logic 110DTa may provide "01010001(2)" to the input terminal of the plurality of encoding flipflops 111. "01010001(2)" input to the input terminal of the plurality of encoding flipflops 111 may be latched to the output terminal of the plurality of encoding flipflops 111 based on the clock signal clk.

In the third clock cycle clockcycle3, "01010001(2)" may be latched as the n-th encoded data Dn[0:7] to the output terminal of the plurality of encoding flipflops 111, and "11101111(2)" as the (n+1)th encoded data Dn+1[0:7] to the input terminal of the plurality of encoding flipflops 111. The XOR result value XORout[0:7] may be "10111110(2)" and the XNOR result value XNORout[0:7] may be "01011001 (2)". Accordingly, the first sum value A may be 6 and the second sum value B may be 4.

Thus, the first comparator 117 may set the (n+1)th invert signal SIn+1 to the turn-on level and output, and the second comparator 118 may set the (n+1)th shift signal SSn+1 to the turn-on level and output. Since the OR operation result value of the (n+1)th invert signal SIn+1 and the (n+1)th shift signal SSn+1 is "1" and the values of the (n+1_0)th data DPn+1[0], the (n+1_1)th data DPn+1[1], and the (n+1_2)th data DPn+1[1] are equally "1", the pattern selector 119PS may set the invert enable signal IEn to the turn-on level and turn off the shift enable signal SEn. The mask unit 110MU may set the (n+1)th transformation signal Tsn+1 to the turn-on level and output.

In the third clock cycle clockcycle3, the data transformation logic 110DTa receives an activated (n+1)th invert signal SIn+1, and invert "11101111(2)" to "00010000(2)" and output. The data transformation logic 110DTa may provide "00010000(2)" to the input terminal of the plurality of encoding flipflops 111. "00010000(2)" input to the input terminal of the plurality of encoding flipflops 111 may be latched to the output terminal of the plurality of encoding flipflops 111 based on the clock signal clk.

In the fourth clock cycle clockcycle4, "00010000(2)" may be latched as the n-th encoded data Dn[0:7] to the output terminal of the plurality of encoding flipflops 111, and "10100001(2)" may be latched as the (n+1)th data DPn+1 [0:7] to the input terminal of the plurality of encoding flipflops 111. The XOR result value XORout[0:7] may be "10110001(2)" and the XNOR result value XNORout[0:7] may be "00111111(2)". Accordingly, the first sum value A may be 4 and the second sum value B may be 6.

Thus, the first comparator 117 may turn off the (n+1)th invert signal SIn+1 and output, and the second comparator 118 may set the (n+1)th shift signal SSn+1 to the turn-on level and output. Since the OR operation result value of the (n+1)th invert signal SIn+1 and the (n+1)th shift signal SSn+1 is "1" and the values of the (n+1_1)th data DPn+1[1] and the (n+1_2)th data DPn+1[1] are equally "0" and the value of the (n+1_0)th data DPn+1[0] is "1", the value of the (n+1_1)th data DPn+1[1] is different. Thus, the pattern selector 119PS may turn off both the invert enable signal IEn and the shift enable signal SEn. The mask unit 110MU may turn off the (n+1)th transformation signal Tsn+1 and output.

In the fourth clock cycle clockcycle4, the data transformation logic 110DTa receive the (n+1)th invert signal SIn+1 and the (n+1)th shift signal SSn+1, which are all deactivated, and may maintain "10100001(2)" as it is and output. The data transformation logic 110DTa may provide "10100001(2)" to the input terminal of the plurality of encoding flipflops 111. "10100001(2)" input to the input terminal of the plurality of encoding flipflop 111 may be latched to the output terminal of the plurality of encoding flipflops 111 based on the clock signal clk.

In FIG. 9 and FIG. 10, the data encoding circuit 110*a* may receive the (n+1)th data DPn+1[0:7] in the order of "01000001(2)", "10100010(2)", "11101111(2)", and "10100001(2)" in the first to fourth clock cycles clockcycle1 to clockcycle4. The data encoding circuit 110*a* may output the (n+1)th data DPn+1[0:7] in the order of "01000001(2)", "01010001(2)", "00010000(2)", and "10100001(2)" in the first to fourth clock cycles clockcycle1 to clockcycle4. The data encoding circuit 110*a* may output the (n+1)th transformation signal Tsn+1 in the order of "0(2)", "1(2)", "1(2)", and "0(2)".

FIG. 11 to FIG. 12 are provided for description of an example of the decoding operation of the data decoding circuit. FIG. 11 to FIG. 12 illustrate an operation of the data decoding circuit 120*a* of FIG. 7 when the output encoded data Do[0:7], where m is 7, and the output transformation signal Tso are input continuously four times.

Referring to FIG. 7, FIG. 11, and FIG. 12, the data decoding circuit 120*a* may receive "01000001(2)" and the output encoded data Do[0:7] in a first clock cycle clockcycle1', "01010001(2)" in a second clock cycle clockcycle2', "00010000(2)" in a third clock cycle clockcycle3', and "10100001(2)" in a fourth clock cycle clockcycle4'. The data decoding circuit 120*a* may receive "0(2)" as the output transformation signal Tso in the first clock cycle clockcycle1', "1(2)" in the second clock cycle clockcycle2, "1(2)" in the third clock cycle clockcycle3', and "0(2)" in the fourth clock cycle clockcycle4'. The output encoded data Do[0:7] and the output transformation signal Tso received in the first to fourth clock cycles clockcycle1' to clockcycle4' may match an (n+1)th encoded data Dn+1[0:7] and an (n+1)th transformation signal Tsn+1 output from the data encoding circuit 110*a* in the first to fourth clock cycles clockcycle1 to clockcycle4 of FIG. 9 and FIG. 10.

In addition, as described with reference to FIG. 7, the pattern selector 129PS in some implementations may turn off both the output invert signal SIo and the output shift signal SSo to determine the decoding operation for the output encoded data Do[0:m] as a maintenance operation when the value of the output transformation signal Tso is "0". When the value of the output transformation signal Tso is "1", which corresponds to the turn-on level, and the 0th and first output encoded data Do[0:1] are different from each other, the pattern selector 129PS turns off the output invert signal SIo and sets the output shift signal SSo to the turn-on level, thereby determining the decoding operation for the output encoded data Do[0:m] as a shift operation. When the value of the output transformation signal Tso is "1" and the 0th and first output encoded data Do[0:1] are equal to each other, the pattern selector 129PS sets the output invert signal SIo to the turn-on level to turn off the output shift signal SSo, thereby determining the decoding operation for the output encoded data Do[0:m] as an invert operation. However, the determination operation of the pattern selector 129PS is an example, and implementations of the pattern selector 129PS having other operations are within the scope of this disclosure.

In the first clock cycle clockcycle1', the output transformation signal Tso received by the decoding control unit 129 is "0(2)", and therefore the pattern selector 129PS may turn off both the output invert signal SIo and the output shift signal SSo and output. The data transformation logic 120DTa may receive the output invert signal SIo and the output shift signal SSo, which are all turned off.

The data transformation logic 120DTa maintains "01000001(2)" as it is as the output encoded data Do[0:7] based on the turned-off output invert signal SIo and the turned-off output shift signal SSo, and output "01000001(2)" and provide it to the input terminal of the plurality of decoding flipflops 121. "01000001(2)" input to the input terminal of the plurality of decoding flipflops 121 may be latched to the output terminal of the plurality of decoding flipflops 121 based on the clock signal clk.

In the second clock cycle clockcycle2', "01000001(2)" is latched as preceding decoded data DDo−1[0:7] to the output terminal of the plurality of decoding flipflops 121, and "01010001(2)" may be received as the output encoded data Do[0:7]. The output transformation signal Tso received by the decoding control unit 129 is "1(2)", the value of the 0th output encoded data Do[0] is "1", and the value of the first output encoded data Do[1] are "0", which are different, the pattern selector 129PS turns off the output invert signal SIo and sets the output shift signal SSo to the turn-on level and outputs.

The data transformation logic 120DTa performs a circular shift operation in 1-bit units in the left direction for "01010001(2)" to output "10100010(2)" based on the output shift signal SSo, and outputs "10100010(2)" at the input terminal of plurality of decoding flipflops 121. "10100010(2)" input to the input terminal of the plurality of decoding flipflops 121 may be latched to the output terminal of the plurality of decoding flipflops 121 based on the clock signal clk.

In the third clock cycle clockcycle3', "10100010(2)" is latched as preceding decoded data DDo−1[0:7] to the output terminal of the plurality of decoding flipflops 121, and the data decoding circuit 120 may receive "00010000(2)" as the output encoded data Do[0:7]. The output transformation signal Tso received at the decoding control unit 129 is "1(2)", the value of the 0th output encoded data Do[0] is "1", and the value of the first output encoded data Do[1] is "0", and thus the 0th output encoded data Do[0] and the output encoded data Do[1] have the same value. The pattern selector 129PS may set the output invert signal SIo to the turn-on level and turn off the output shift signal SSo and output.

The data transformation logic 120DTa performs an invert operation for "00010000(2)", which is the output encoded data Do[1] based on the output invert signal SIo, and thus outputs "11101111(2)" as the decoded data DDo[0:7] and provides it to the input terminal of the plurality of decoding flipflops 121. "11101111(2)" input to the input terminal of the plurality of decoding flipflops 121 may be latched to the output terminal of the plurality of decoding flipflops 121 based on the clock signal clk.

In the fourth clock cycle clockcycle4', the output transformation signal Tso received at the decoding control unit 129 is "0(2)", and thus the pattern selector 129PS may turn off both the output invert signal SIo and the output shift signal SSo and output. The data transformation logic 120DTa may receive the output invert signal SIo and the output shift signal SSo that are both turned off.

The data transformation logic 120DTa may maintain "10100001(2)" as it is as the output encoded data Do[0:7] based on the turned-off output invert signal SIo and the turned-off output shift signal SSo and output "10100001(2)" as the decoded data Do[0:7]. The data transformation logic 120DTa may provide the decoded data Do[0:7] to the input terminal of the plurality of decoding flipflops 121. "10100001(2)" input to the input terminal of the plurality of decoding flipflops 121 may be latched to the output terminal of the plurality of decoding flipflops 121 based on the clock signal clk.

Referring to FIG. 6, FIG. 8, and FIG. 9 together, in the first to fourth clock cycles clockcycle1' to clockcycle4', the decoded data DDo[0:7] output by the data transformation logic 120DTa is output in the order of "01000001(2)", "10100010(2)", "11101111(2)", and "10100001(2)", and the output order of the decoded data DDo[0:7] is equal to the input order of the (n+1)th data DPn+1[0:7] of FIG. 8 and FIG. 9.

In the first clock cycle clockcycle1 of FIG. 9, "01000001 (2)" output by performing the maintenance operation in the data transformation logic 110DTa may be decoded by performing a maintenance operation by the data transformation logic 120DTa in the first clock cycle clockcycle1' in FIG. 11.

"01010001(2)", which is circularly shifted to the right direction by 1 bit unit and output by the data transformation logic 110DTa in the second clock cycle clockcycle2 of FIG. 9 may be circularly shifted to the left direction by 1 bit unit and decoded by the data transformation logic 120DTa in the second clock cycle clockcycle2' of FIG. 11. However, the shift direction of the circular shift operation performed in the data transformation logic 110DTa and the shift direction of the circular shift operation performed in the data transformation logic 120DTa are different from each other.

"00010000(2)" inverted and output by the data transformation logic 110DTa in the third clock cycle clockcycle3 of FIG. 10 may be inverted and decoded by the data transformation logic 120DTa in the third clock cycle clockcycle3' of FIG. 12.

"10100001(2)" output by performing a maintenance operation by the data transformation logic 110DTa in the fourth clock cycle clockcycle4 of FIG. 10 may be decoded by the maintenance operation performed by the data transformation logic 120DTa in the fourth clock cycle clockcycle4' of FIG. 12.

The reliability of the encoding/decoding operations of the data encoding circuit 110 and the data decoding circuit 120 can be increased by setting the determination operation of the pattern selector 119PS of the data encoding circuit 110 and the pattern selector 129PS of the data decoding circuit 120.

Referring to FIG. 9 to FIG. 12, the clock gating operation in the plurality of encoding clock gating circuits 112 for the (n+1)th encoded data Dn+1[0:m] in the first to fourth clock cycles clockcycle1 to clockcycle4 is performed 16 times, and the clock gating operation of the plurality of decoding clock gating circuits 122 for the decoded data DDo[0:m] in the first to fourth clock cycles clockcycle1' to clockcycle4' is performed 11 times.

The data encoding circuit 110 may reduce the number of data toggles in the sequential circuit by performing an encoding operation on data, and particularly the number of the clock gating is increased by increasing the clock gating operation efficiency for continuously input/output data, thereby improving power consumption to pass data.

The data encoding circuit 110 can improve the operation efficiency of all gate clock circuits CG00 to CGTx (refer to FIG. 3) disposed in the data channel CW (refer to FIG. 3) by efficiently encoding the data pattern in data clock gating operation.

Figure 13:
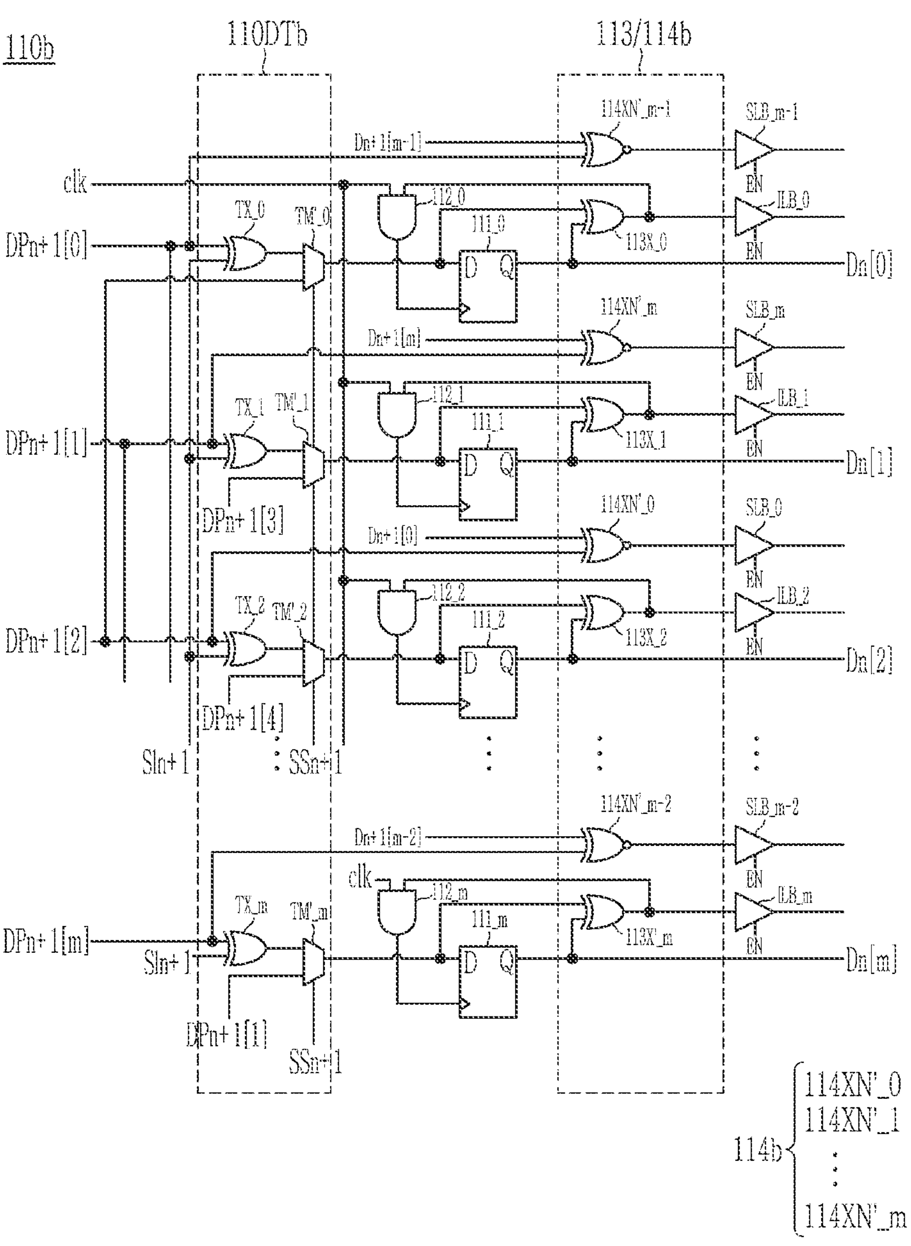
FIG. 13 is a diagram illustrating an example of a data encoding circuit according to some implementations.

FIG. 13 is provided for description of the data encoding circuit according to some implementations. FIG. 13 is provided for description of a part of a data encoding circuit 110*b*. For convenience in description, the data encoding circuit 110*b* will be described with reference to FIG. 13 through comparison with the data encoding circuit 110*a* of FIG. 6. In particular, a data transformation unit 110DTb, which is different from the data transformation unit 110DTa of FIG. 6, and a second bit operator 114*b*, which is different from the second bit operator 114*a* of FIG. 6, will be mainly described.

Referring to FIG. 6 and FIG. 13, the data transformation unit 110DTb may include 0-th to m-th transformation XOR operators TX_1 to TX_m and 0th to m-th MUXs TM'_0 to TM'_m.

Each of the 0th to m-th transformation MUXs TM'_0 to TM'_m may receive a result value of each of the 0-th to m-th transformation XOR operators TX_1 to TX_m and data circularly shifted by 2 bit units in the right direction with respect to the (n+1)th data DPn+1[0:m], and may receive the (n+1)th shift signal SSn+1 as a selection signal. Each of the 0th to m-th transformation MUXs TM'_0 to TM'_m may output any one of the result values of the 0-th to m-th transformation XOR operators TX_1 to TX_m and the circularly shifted data based on the (n+1)th shift signal SSn+1.

For example, the 0th transformation MUX TM'_0 may receive a result value of the 0th transformation XOR operator TX_0 and the (n+1_2)th data DPn+1[2], and may receive the (n+1)th shift signal SSn+1 as a selection signal. When the received (n+1)th shift signal SSn+1 is "0", the 0th transformation MUX TM'_0 outputs the result value of the 0th transformation XOR operator TX_0 and provides to the 0th encoding flipflop 111_0. When the received (n+1)th shift signal SSn+1 is "1", the 0th transformation MUX TM'_0 may output the (n+1_2)th data DPn+1[2] and provide to the 0th encoding flipflop 111_0.

In addition, the m-th transformation MUX TM'_m may receive a result value of the m-th transformation XOR operator TX_m and the (n+1_1)th data DPn+1[1], and receive the (n+1)th shift signal SSn+1 as a selection signal. When the (n+1)th shift signal SSn+1 is "0", the m-th transformation MUX TM'_m may output a result value of the m-th transformation XOR operator TX_m and provide to the m-th encoding flipflop 111_*m*. When the (n+1)th shift signal SSn+1 is "1", the 0-th transformation MUX TM'_m may output the (n+1_1)th data DPn+1[1] and provide to the m-th encoding flipflop 111_*m*.

The data transformation unit 110DTb may output the (n+1)th encoded data Dn+1[0:m] on which any one of the maintenance operation, the invert operation, or the circular shift operation is performed with respect to the (n+1)th data DPn+1[0:m] based on the (n+1)th invert signal SIn+1 and the (n+1)th shift signal SSn+1 and provide to the plurality of encoding flipflops 111. In particular, the circular shift operation of the data transformation unit 110DTb may be shifted to by a 2-bit unit.

The second bit operator 114*b* may include 0th to m-th XNOR operators 114XN'_0 to 114XN'_m. The 0th to m-th XNOR operators 114XN'_0 to 114XN'_m may perform an XNOR bit operation on the n-th encoded data Dn[0:m] latched to the output terminal of the 0th to m-th encoding flipflops 111_0 to 111_*m* and data circularly shifted by the 2-bit unit in the right direction with respect to the (n+1)th data DPn+1[0:m].

For example, the 0th XNOR operator 114XN'_0 may perform an XNOR operation for the (n_0)th encoded data Dn[0] latched to the 0th encoding flipflop 111_0 and the (n+1_1)th data DPn+1[1] input to the input terminal of the first encoding flipflop 111_1, and output and provide an 0th XNOR result value XNORout[0] to the second adder 116. In addition, the m-th XNOR operator 114XN'_m may perform an XNOR operation with respect to an (n_m)th encoded data Dn[m] latched to the output terminal of the m-th encoding flipflop 111_*m* and an (n+1_1)th data DPn+1[1] input to the input terminal of the first encoding flipflop 111_1, and output and provide an m-th XNOR result value XNORout[m] to the second adder 116.

The XNOR result values XNORout[0:m] of the 0th to m-th XNOR operators 114XN'_0 to 114XN'_m may be transmitted to the second adder 116 through the 0-th to m-th shift loop prevention buffers SLB_0 to SLB_m. When the enable signal EN is input to the 0-th to m-th shift loop prevention buffers SLB_0 to SLB_m, the XNOR result value XNORout[0:m] may be input to the second adder 116.

Figure 14:
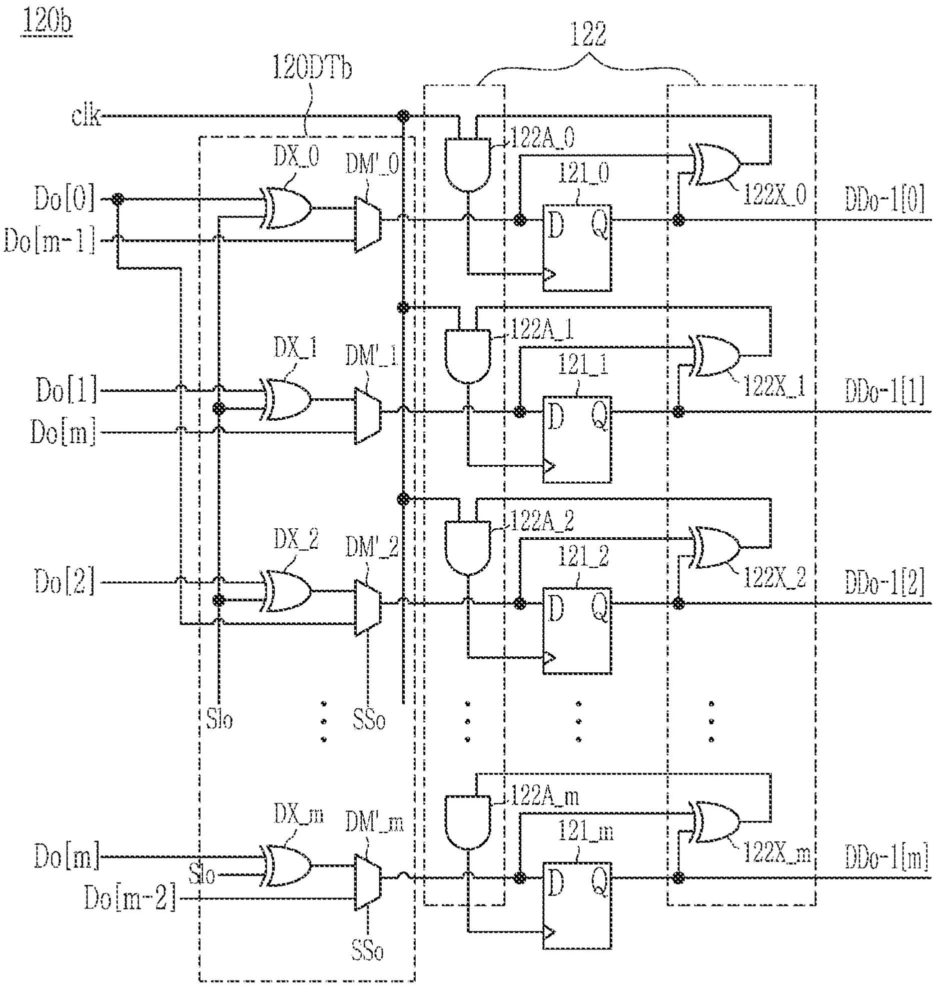
FIG. 14 is a diagram illustrating an example of a data decoding circuit according to some implementations.

FIG. 14 is provided for description of the data decoding circuit according to some implementations. FIG. 14 is provided for description of a data decoding circuit 120*b*. For convenience in description, the data decoding circuit 120*b* of FIG. 14 will be described through comparison with the data decoding circuit 120*a* of FIG. 7. In particular, a data transformation unit 120DTb, which is different from the data transformation unit 120DTa of FIG. 7, will be mainly described.

Referring to FIG. 7 and FIG. 14, in some implementations, the data transformation unit 120DTb may include 0th and m-th decoding XOR operators DX_0 to DX_m and 0th to m-th decoding MUXs DM'_0 to DM'_m.

Each of the 0th to m-th decoding MUXs DM'_0 to DM'_m may receive a result value of each of the 0th to m-th decoding XOR operators DX_0 to DX_m and data circularly shifted by a 2-bit unit in the left direction for the output encoded data Do[0:m], and may receive the output shift signal SSo as a selection signal (some SSo connections are omitted from FIG. 14 for clarity). Each of the 0th to m-th decoding MUXs DM'_0 to DM'_m may output any one of a result value of each of the 0th and m-th decoding XOR operators DX_0 to DX_m and the circularly shifted data based on the output shift signal SSo.

For example, the 0th decoding MUX DM'_0 may receive a result value of the 0th decoding XOR operator DX_0 and the m-th output encoded data Do[m−1], and may receive the output shift signal SSo as a selection signal. When the output shift signal SSo is "0", the 0th decoding MUX DM'_0 may output a result value of the 0th decoding XOR operator DX_0 and provide to the 0th decoding flipflops 121_0. When the output shift signal SSo is "1", the 0th decoding MUX DM'_0 may output the m-th output encoded data Do[m-1] and provide to the 0th decoding flipflops 121_0.

In addition, the first decoding MUX DM'_1 may receive a result of the first decoding XOR operator DX_m and the 0th output encoded data Do[m], and may receive the output shift signal SSo as a selection signal. When the output shift signal SSo is "0", the first decoding MUX DM'_1 may output the result value of the first decoding XOR operator DX_m and provide to the first decoding flipflops 121_1. When the output shift signal SSo is "1", the first decoding MUX DM'_1 may output the 0th output encoded data Do[m] and provide to the first decoding flipflops 121_1.

Figure 15:
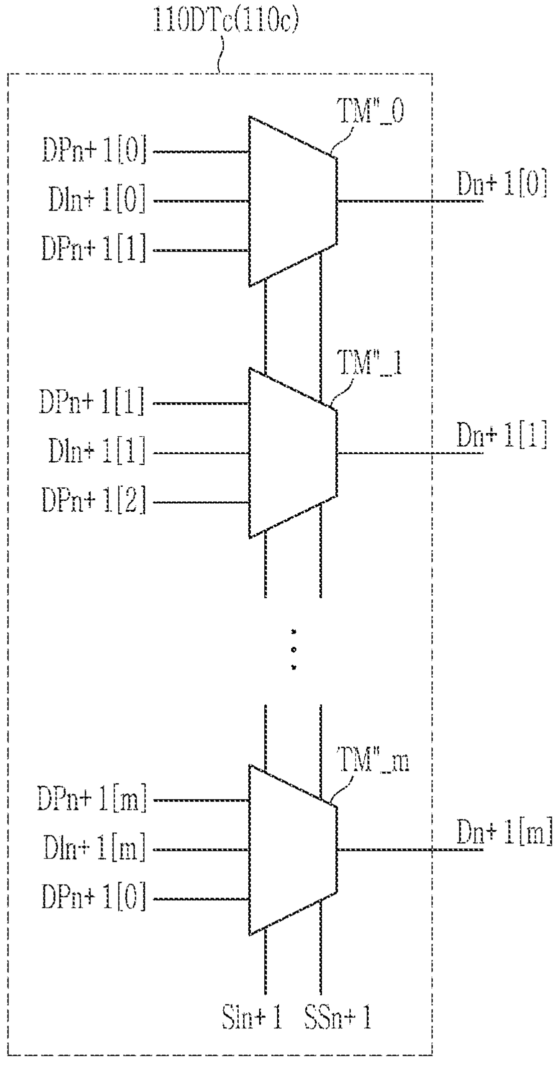
FIG. 15 is a diagram illustrating an example of a data encoding circuit according to some implementations.

FIG. 15 is provided for description of the data encoding circuit according to some implementations. FIG. 15 is provided for description of a data transformation unit 110DTc of a data encoding circuit 110*c*. For convenience in description, the data transformation unit 110DTc of FIG. 15 will be described through comparison with the data transformation unit 110DTa of FIG. 6.

The data transformation unit 110DTc may include 0th to m-th transformation MUXs TM"_0 to TM"_m.

Each of the 0th to m-th transformation MUXs TM"_0 to TM"_m may receive bits of each of (n+1)th data DPn+1[0:m], bits of each of (n+1)th invert data DIn+1[0:m] with respect to the (n+1_0)th data DPn+1[0], and bits circularly shifted in 1-bit units in the right direction for each of the (n+1)th data DPn+1[0:m], and may receive the (n+1)th shift signal SSn+1 and the (n+1)th invert signal SIn+1 as selection signals. Each of the 0th to m-th transformation MUXs TM"_0 to TM"_m may output any one of the (n+1)th data DPn+1[0:m], the (n+1)th invert data DIn+1[0:m], or the circularly shifted data based on a combination of the (n+1)th shift signal SSn+1 and the (n+1)th invert signal SIn+1.

For example, the 0th transformation MUX TM"_0 may receive the (n+1_0)th data DPn+1[0], the (n+1)th invert data DIn+1[0], and the (n+1_1)th data DPn+1[1], and may receive the (n+1)th shift signal SSn+1 and the (n+1)th invert signal SIn+1 as selection signals. Through the combination of the (n+1)th shift signal SSn+1 and the (n+1)th invert signal SIn+1, the 0th transformation MUX TM"_0 may output any one of the (n+1_0)th data DPn+1[0], the (n+1)th invert data DIn+1[0], and the (n+1_1)th data DPn+1[1] as the (n+1_0)th encoded data Dn+1[0].

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

Some examples have been described in detail above, but the scope of the present disclosure is not limited thereto, and numerous variations and improvements made by a person of an ordinary skill in the art using the concepts of the present disclosure may also fall within the scope of the present disclosure.

What is claimed is:

1. A system on chip comprising:

a bus including a data channel through which data is transmitted in at least one direction; and a master interface configured to receive first data, perform a bit operation on the first data and on second data output by the master interface and corresponding to a clock cycle before a clock cycle of the first data, determine an encoding operation for the first data based on a result of the bit operation;

perform the encoding operation on the first data, to obtain encoded data; and provide the encoded data and a transformation signal indicating the encoding operation to the data channel, wherein a first value of the transformation signal indicates a circular shift operation as the encoding operation.

2. The system on chip of claim 1, wherein the encoding operation comprises a maintenance operation, an invert operation, or the circular shift operation.

3. The system on chip of claim 2, wherein the transformation signal is 1 bit.

4. The system on chip of claim 1, wherein the master interface is configured to provide a second value of the transformation signal indicating an invert operation, and wherein the first value of the transformation signal and the second value of the transformation signal are the same.

5. The system on chip of claim 1, wherein the master interface is configured to provide a second value of the transformation signal indicating an invert operation, and a third value of the transformation signal indicating a maintenance operation, and wherein the second value of the transformation signal and the third value of the transformation signal are different from each other.

6. The system on chip of claim 1, wherein the circular shift operation includes shifting the first data by 2 bit units.

7. The system on chip of claim 1, wherein the master interface comprises:

a first bit operator that outputs an XOR result value by performing an XOR bit operation on the first data and the second data; and a second bit operator that outputs an XNOR result value by performing an XNOR bit operation on (i) first shift data obtained by performing the circular shift operation on the first data, and (ii) the second data.

8. The system on chip of claim 7, wherein the master interface comprises:

a first adder configured to output a first sum value by bit counting the XOR result value;

a second adder configured to output a second sum value by bit counting the XNOR result value;

a first comparator configured to output an invert signal based on the first sum value and a number of bits of the first data; and a second comparator configured to output a shift signal based on the first sum value, the second sum value, and the number of bits of the first data.

9. The system on chip of claim 8, wherein the first comparator is configured to output the invert signal based on whether the first sum value is greater than the number of bits of the first data divided by two.

10. The system on chip of claim 8, wherein the second comparator is configured to output the shift signal based on whether the second sum value is greater than a difference between the number of bits of the first data and the first sum value.

11. The system on chip of claim 1, wherein the master interface comprises a control unit configured to receive an invert signal, a shift signal, and at least a part of the first data, wherein the invert signal and the shift signal are based on the result of the bit operation.

12. The system on chip of claim 11, wherein the control unit is configured to output an invert enable signal for the invert signal and a shift enable signal for the shift signal, and wherein the master interface is configured to receive the invert signal, the shift signal, the invert enable signal, and the shift enable signal, enable the invert signal and the shift signal, and output the transformation signal.

13. The system on chip of claim 12, wherein the control unit is configured to turn off the invert enable signal and the shift enable signal when the first data and the second data are not provided to the data channel in a burst mode.

* * * * *